(12) United States Patent
Hebel

(10) Patent No.: US 8,998,257 B2
(45) Date of Patent: Apr. 7, 2015

(54) LIFT SYSTEM AND APPARATUS FOR USE WITH MOTORIZED TRICYCLES

(71) Applicant: Rory J. Hebel, Volo, IL (US)

(72) Inventor: Rory J. Hebel, Volo, IL (US)

( * ) Notice: Subject to any disclaimer, the term of this patent is extended or adjusted under 35 U.S.C. 154(b) by 31 days.

(21) Appl. No.: 14/022,335

(22) Filed: Sep. 10, 2013

(65) Prior Publication Data

US 2015/0069743 A1     Mar. 12, 2015

(51) Int. Cl.
  *B60R 9/00*      (2006.01)
  *A61G 5/10*      (2006.01)
  *B62K 5/05*      (2013.01)

(52) U.S. Cl.
  CPC .. *A61G 5/104* (2013.01); *B62K 5/05* (2013.01)

(58) Field of Classification Search
  USPC ........... 280/762, 769; 414/462; 224/400, 412, 224/416, 417, 419, 441, 495, 545, 548, 553, 224/567
  See application file for complete search history.

(56) References Cited

U.S. PATENT DOCUMENTS

| | | | |
|---|---|---|---|
| 4,213,729 A * | 7/1980 | Cowles et al. | 414/462 |
| 4,297,069 A | 10/1981 | Worthington | |
| 4,411,580 A | 10/1983 | Kelly | |
| 4,415,056 A | 11/1983 | Smith | |
| 4,565,482 A | 1/1986 | Baker | |
| 4,573,854 A | 3/1986 | McFarland | |
| 4,580,652 A | 4/1986 | Turner et al. | |
| 4,697,975 A | 10/1987 | Lippold | |
| 4,738,581 A * | 4/1988 | Kuhlman | 414/462 |
| 4,961,477 A * | 10/1990 | Sweeney | 180/219 |
| 5,482,424 A | 1/1996 | Jones et al. | |
| 5,536,130 A * | 7/1996 | Edensor | 414/462 |
| 6,179,546 B1 | 1/2001 | Citrowske | |
| 6,386,817 B1 * | 5/2002 | Cash | 414/462 |
| 6,595,398 B2 | 7/2003 | Himel, Jr. | |
| 7,419,024 B1 | 9/2008 | Tavantzis | |
| 7,823,674 B2 | 11/2010 | Bowles et al. | |
| 7,967,336 B2 * | 6/2011 | Biseli | 280/769 |
| 2003/0095856 A1 | 5/2003 | Ablabutyan et al. | |
| 2006/0249322 A1 | 11/2006 | Maki et al. | |
| 2007/0189885 A1 | 8/2007 | Madormo et al. | |
| 2008/0283320 A1 | 11/2008 | Bowles et al. | |
| 2009/0016866 A1 | 1/2009 | Zaragoza et al. | |
| 2012/0275891 A1 | 11/2012 | Pace et al. | |
| 2013/0011231 A1 | 1/2013 | Tekulve | |

FOREIGN PATENT DOCUMENTS

DE     3124256 A1 * 1/1983 .............. B62K 5/02

* cited by examiner

*Primary Examiner* — John Walters
(74) *Attorney, Agent, or Firm* — Meroni & Meroni, P.C.; Charles F. Meroni, Jr.; Christopher J. Scott

(57) ABSTRACT

A wheelchair transport system and apparatus enables users to transport a wheelchair by way of a motorized, tadpole-configured tricycle. The wheelchair transport apparatus includes a main frame, a pivot assembly, and a lever arm assembly. The main frame includes an elongate frame member that attaches to a motorized tricycle. The pivot assembly includes pivot arm and chair support assemblies. The pivot arm assembly includes two pivot arms pivotally attached to the main frame. The chair support assembly includes two support members pivotally attached to the pivot arms. The lever arm assembly is attached to a forward pivot arm. Together, the lever arm assembly, the pivot arms, and the support arms are positionable intermediate a lowered position and a raised position. The raised positions enable the user to transport a wheelchair as supported upon the support arms.

20 Claims, 17 Drawing Sheets

LIFT SYSTEM AND APPARATUS FOR USE WITH MOTORIZED TRICYCLES

BACKGROUND OF THE INVENTION

1. Field of the Invention

The present invention generally relates to a lift system and apparatus for enabling a user to transport certain materials by way of a motorized vehicle. More particularly, the present invention relates to a wheelchair lift system and apparatus for enabling a user/operator to transport a wheelchair by way of a motorized tricycle.

2. Discussion of the Prior Art

U.S. Pat. No. 4,411,580 ('580 Patent), which issued to Kelly, discloses a Vehicle Attached Support for Wheelchair Transport. The '580 Patent describes a vehicle attached wheelchair support formed by a stationary frame mounted on a horizontal base tube and a lateral pivotally connected frame joined to the base tube permitting movement of one end portion toward and away from the surface of the earth. The base tube is telescopically joined to a socket forming member secured to an end surface of a vehicle. The pivoting frame forms a space receiving the large wheels and major portion of a wheelchair in supporting relation. A handle on the pivoting frame enables the tilting frame to be lifted to a stationary frame locked position or moved toward the surface of the earth for loading and unloading the wheelchair.

U.S. Pat. No. 4,565,482 ('482 Patent), which issued to Baker, discloses a Wheelchair Dockage and Storage System. The '482 Patent essentially describes an assembly for raising and collapsing a wheelchair having collapsible legs including a first arm having a first hook at the end thereof for reversibly engaging the proximal leg of the wheelchair and having a lowered and a raised position, and a second arm having a second hook at the end thereof for reversibly engaging the distal leg of the wheelchair and being operatively connected to the first arm for movement between the raised and lowered positions therewith. The second arm has a retracted and an extended position relative to the first arm.

A first motor reversibly moves the first and second arms between the raised and lowered positions for raising and lowering the wheelchair, and a second motor reversibly moves the second arm relative to the first arm to reversibly collapse the distal leg of the wheelchair against the proximal leg thereof. A method is provided including the steps of attaching the first arm of the assembly to the proximal leg of the wheelchair, extending the second arm and attaching the second arm to the distal leg of the wheelchair, pivoting the first arm upwardly to raise the first and second arms and the wheelchair attached thereto, and retracting the second arm relative to the first arm to collapse the legs of the wheelchair together.

U.S. Pat. No. 4,697,975 ('975 Patent), which issued to Lippold, discloses a Wheelchair Carrier. The '975 Patent describes a wheelchair carrier mounted on the rearwardly extending hitch of a vehicle such as an automobile or the like. A platform is pivotally mounted on a horizontally extending support which is operatively mounted on the vehicle hitch. The platform may be pivotally moved from a horizontal carrying position to an inclined loading and unloading position. When the platform is in its inclined position, one end of the platform may be positioned beneath the handles of the folded wheelchair with the wheelchair then being moved towards the carrier. Pivotal movement of the carrier from its inclined position to its horizontal carrying position causes the wheelchair to be lifted from the ground and positioned on the carrier. The carrier is locked in its horizontal carrying position by means of a spring-loaded lock. The wheelchair is held on the carrier by means of a spring-loaded connector.

U.S. Pat. No. 4,961,477 ('477 Patent), which issued to Sweeney, discloses a Wheel Chair Transporter. The '477 Patent describes a wheelchair transporter for transferring a handicapped person, while seated in a wheelchair, from a ground level into an operative position on a motorcycle. The wheelchair is intended for independent use, but is designed to couple with a glide track on the motorcycle. The glide track receives rollers mounted on the wheelchair and guides the wheelchair into operational position on the motorcycle. The motorcycle includes a support unit for stabilization during the transfer of the wheelchair, and in the course of initiating and ending a ride on the motorcycle by a handicapped person seated in the wheelchair, operating the motorcycle.

U.S. Pat. No. 5,482,424 ('424 Patent), which issued to Jones et al., discloses a Car Rack for Wheelchairs and the Like. The '424 Patent describes a rack for mounting on the rear of a car for carrying a wheelchair. The wheelchair has a seat supporting framework that includes two parallel horizontal frame members close to the ground. The rack includes a pair of chair support members for engaging the two horizontal frame members with the chair on the ground and powered lift members for raising the chair to a traveling position above the ground and for lowering the chair downwardly to the ground for removing the chair from the rack thereby eliminating any need for anyone to lift the chair.

U.S. Pat. No. 6,595,398 ('398 Patent), which issued to Himel, Jr., discloses a Vehicle-Mounted Wheelchair Support Rack Assembly with Lifting Capability. The '398 Patent describes a vehicle-mounted wheelchair rack assembly with lifting capabilities for transporting a folded wheelchair at the rear of a vehicle. The rack assembly integrates a jack assembly into a stationary L-shaped frame coupled to the rear of the vehicle. Additionally, the jack assembly is coupled to a telescopic T-joint member wherein actuation of the jack assembly moves a vertical casing of the T-joint member along a vertical strut member of the L-shaped frame. The vertical strut member has a longitudinal opening or channel which has a length that defines a continuous range for lifting or elevating or, alternately, lowering the T-joint member and a folded wheelchair strapped to the T-joint member.

U.S. Pat. No. 7,967,336 ('336 Patent), which issued to Biseli, discloses a Wheelchair Transport Rack for Motorcycles and Recreational Vehicles. The '336 Patent describes a transporting device for transporting a wheelchair directly on a motorcycle or recreational vehicle, the device being configured to include a frame attachment portion for attaching the bracket to a frame portion of a motorcycle or recreational vehicle, a spaced-apart portion configured to receive and secure a portion of a foot rest of a wheelchair, and a spaced-apart wheelchair axle receiving and securement portion located at a level above the frame attachment portion and the portion for receiving and securing a portion of the foot rest.

United States Patent Application No. 2003/0095856, which was authored by Ablabutyan et al., describes a wheelchair lift for supporting a wheelchair bound passenger and for moving the passenger between ground level and an opening in a vehicle. The wheelchair lift includes a platform and pivotal mechanism engaging the platform as well as a bridge plate for assuming a horizontal orientation to enable the passenger to proceed through the vehicle opening and a vertical orientation to act as a roll stop as the platform proceeds between the ground and the vehicle opening.

The bridge plate includes a non-linear channel configured within its side which engages a pivotal mechanism which includes an upper parallelogram structure and hydraulic apparatus to move the upper parallelogram structure to move the platform. Also included is a lower parallelogram structure which is in sliding engagement with the upper parallelogram structure during at least a portion of the motion when the platform is moved between the ground and the vehicle opening. The lower parallelogram also is provided with a saddle bolt for sliding engagement with the non-linear channel such that movement of the lower parallelogram acts to raise and lower the bridge plate upon movement of the platform.

United States Patent Application No. 2012/0175891, which was authored by Pace and McKay, describes a compact wheelchair lift device that can be quickly and easily installed to load a wheelchair into the trunk of a vehicle. A representative lift is designed such that the wheelchair may be loaded properly and completely without the lift or the wheelchair striking the vehicle. The representative lift is also designed to reduce back strain on an operator by precluding the need to lift the wheelchair. In one embodiment, the wheelchair lift comprises a base frame that may be installed in the trunk of an automobile, a wheelchair platform configured to hold a wheelchair, a sliding frame configured to slide the wheelchair platform to or from the trunk of a vehicle, and a pivoting lift mechanism configured to raise or lower the wheelchair platform to or from the ground.

United States Patent Application No. 2013/0011231, which is authored by Tekulve, describes an apparatus for lifting a wheelchair, the wheelchair including a frame with first and second rear frame members and first and second front frame members, the apparatus including a ground-engageable base; a chair connection assembly having connection means for securely connecting to the frame of a wheelchair; a lift assembly having first and second lift members, the first lift member connected with the chair connection assembly and the second lift member connected to the base; power means connected with the lift assembly for moving the lift assembly between a retracted, down position and an extended, up position; and a lift control assembly for connecting the power means with the lift assembly and for controlling the lift assembly.

From a consideration of the prior art it will be seen that the prior art perceives a need for a lift system and apparatus cooperable in combination with a motorized tricycle for enabling a user/operator to transport a wheelchair or similar other apparatus so as to enhance the user/operator's life experience. In this regard, it is noted that three-wheeled motorcycles differ significantly from two-wheeled motorcycles, the former enabling wheel-chair bound, disabled individuals a greater degree of freedom to operate said machinery and provide them with some enhanced degree of independent living.

The present invention has been designed to cooperate with a three-wheeled motorcycle so that the wheelchair bound individual or user/operator may be able to avail him or herself of enhanced independent living obtainable by virtue of the ability to motorcycle with the advantage of transporting the user's wheelchair at the same time. The present invention thus provides an affordable way for a disabled person to operate a motorcycle. The Can-Am Spyder motorcycle already has shifting controls on the handle bars, and with the addition of a hand-operable break lever the only thing missing for the disabled individual is the ability to transport the individual's wheelchair.

The Can-Am Spyder was first introduced in 2008. The motorcycle design has two wheels in front and a one wheel in the rear, thereby providing a tadpole style motorized tricycle. This basic design allows lateral space adjacent the rear wheel for a wheelchair lift, which design opened the present area of development in the art. In other words, the basic tadpole style motorized tricycle in combination with a lift apparatus according to the present invention enables wheelchair bound individuals to achieve a greater degree of independence and freedom of travel.

SUMMARY OF THE INVENTION

Accordingly, it is a primary object of the present invention to provide a wheelchair lift system and apparatus for enabling a disabled person to achieve a greater degree of independence and freedom of travel. To achieve this primary and other readily identifiable objectives, the lift system and/or apparatus according to the present invention essentially comprises a wheelchair transport apparatus usable in combination with a tadpole-configured motorized tricycle.

The tadpole-configured motorized tricycle usable in combination with the wheelchair transport apparatus according to the present invention basically comprises two laterally opposed front wheels, a rear wheel, a lateral trike plane, a maximum left lateral trike extent, a maximum right lateral trike extent, and a trike weight. The maximum left and right lateral trike extents are equidistant distant from the lateral trike plane at a select extent distance.

The wheelchair transport apparatus basically comprises a main frame, a pivot assembly, a lever arm assembly, a maximum lateral apparatus extent, and an apparatus weight. The maximum lateral apparatus extent is preferably less than the select extent distance. The main frame comprises an elongate frame member, an upper attachment arm construction, an L-shaped chair-spacer construction, and attachment means for attaching the frame member to the motorized tricycle. The upper attachment arm construction extends intermediate an upper portion of the motorized tricycle and the frame member in a lateral direction for laterally spacing arm attachment sites of the upper attachment arm construction from the frame member.

The chair-spacer construction preferably comprises an upright spacer portion and a lateral spacer portion. The upright spacer portion extends vertically and the lateral spacer portion extends laterally from the frame member. The lateral spacer portion spaces an upper portion of a supported wheelchair from the upright spacer portion, and a medial wheel assembly of the supported wheelchair is receivable in inferior adjacency to the lateral portion and in lateral adjacency to the upright spacer portion.

The pivot assembly comprises a pivot arm assembly and a chair support assembly. The pivot arm assembly comprises a forward pivot arm, a rearward pivot arm and means for pivotally attaching the forward and rearward pivot arm to the main frame via a pair of frame-fixed upper pivot axes.

The chair support assembly comprises a forward support member, a rearward support member and means for pivotally and respectively attaching the forward and rearward support members to the forward and rearward pivot arms. The support members are coaxial with a pair of frame-translatable lower pivot axes. The pivot arms are parallel to one another and the support members are parallel to one another. The parallel pivot arms and the parallel support members enhance uniform motion and transport of said wheelchair during chair transport operations.

The chair support assembly further preferably comprises means for maintaining the support members in parallel relation to one another. Said means preferably comprise or are defined by a medial member and a lateral member. The medial and lateral members extend intermediate the forward and rearward support members and each has a vertical dimension for providing stop structure for preventing a supported wheelchair from displacing medially and laterally during transport operations.

The lever arm assembly is attached to the forward pivot arm. Together, the lever arm assembly, the pivot arms, and the support arms are positionable intermediate a lowered position and a raised position. The pivot arms are rotatable about the upper and lower pivot axes and the support members are raisable to the raised position from the lowered position when the lever arm assembly is manually moved from a rearward, lowered position to a forward, raised position.

The raised positions enable transport of a wheelchair having a wheelchair weight as supported upon the support arms. The apparatus weight and the wheelchair weight are less than the trike weight. The trike weight and the maximum left and right lateral trike extents function to maintain the wheelchair transport apparatus and the supported wheelchair in a uniform vertical position during transport.

The lever arm assembly comprises a telescopic lifting arm, which telescopic lifting arm is extendable for increasing torque when moving from the lowered to raised positions, and is further retractable for removing structural obstruction when in the raised position. A latch assembly and a lever assembly are cooperably associated with the arm assembly and frame member, and operable for preventing accidental release of the pivot arms and support members from the raised position.

BRIEF DESCRIPTION OF THE DRAWINGS

Other features of my invention will become more evident from a consideration of the following brief descriptions of drawings.

DETAILED DESCRIPTION OF THE PREFERRED EMBODIMENT

Figure 1:
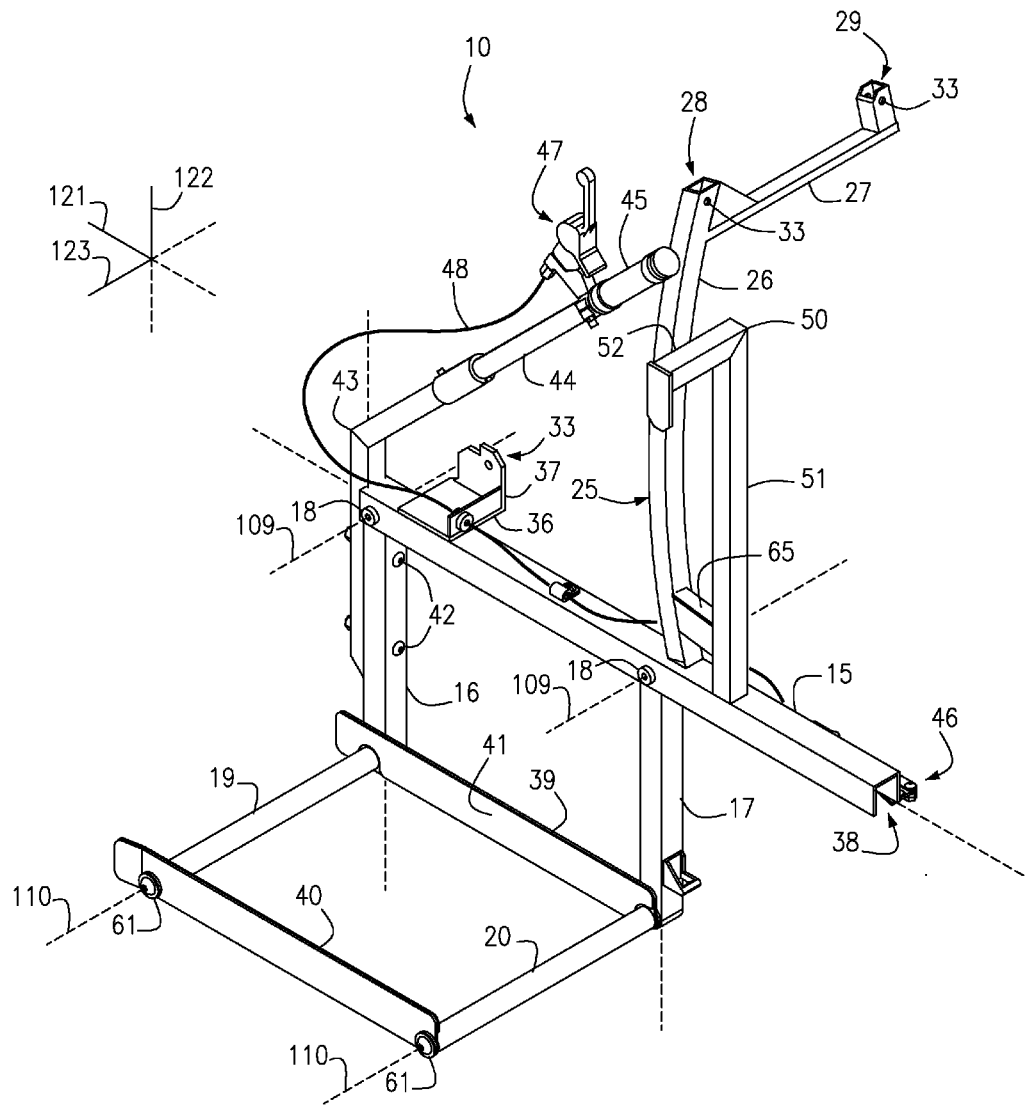
FIG. 1 is a first top rear perspective view of the preferred wheelchair transport apparatus according to the present invention, showing the wheelchair transport apparatus in a chair-receiving lowered position.
Figure 2:
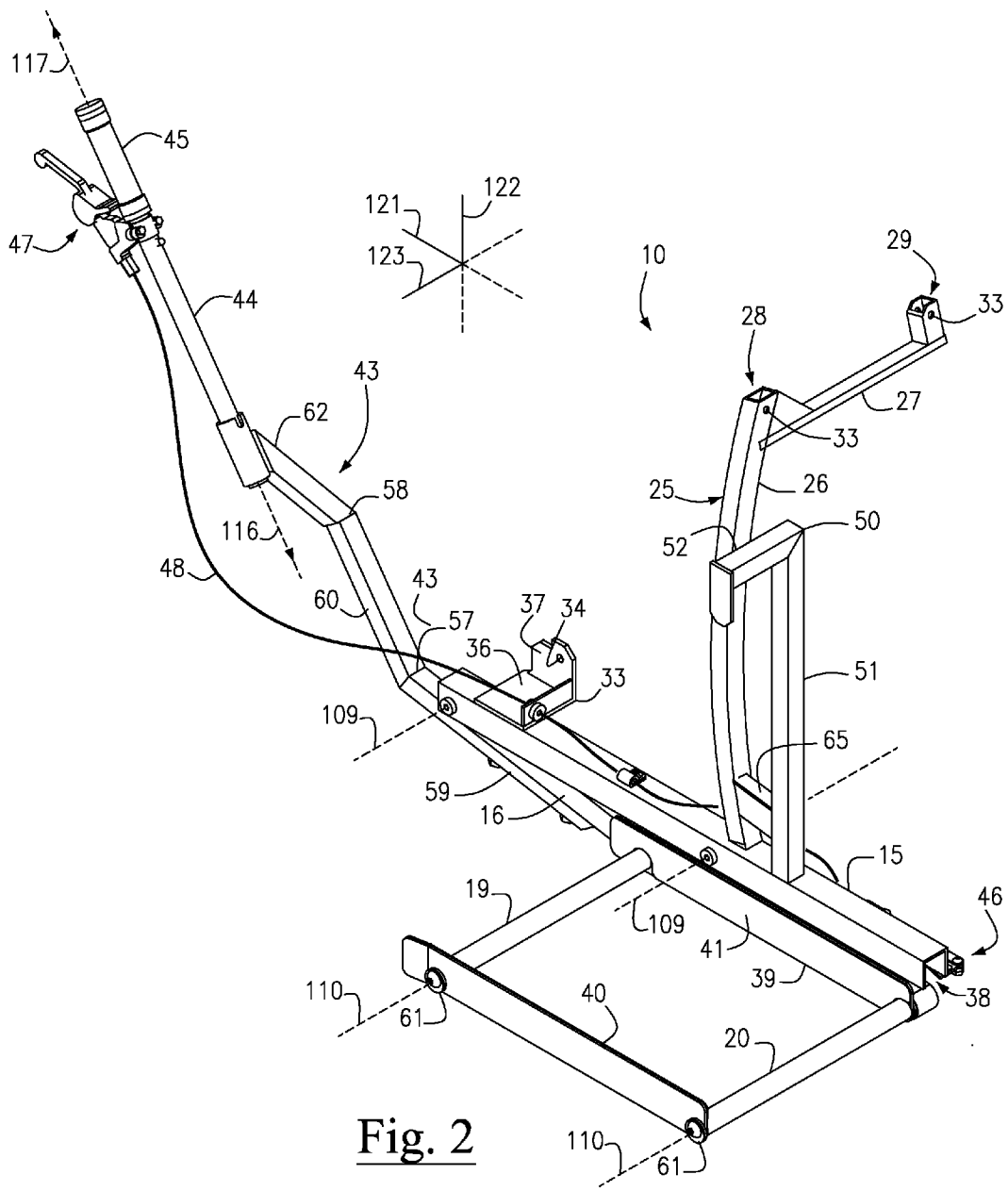
FIG. 2 is a second top rear perspective view of the preferred wheelchair transport apparatus according to the present invention, showing the wheelchair transport apparatus in a first chair-supporting raised position with an extendable lift arm in an extended position.

Referring now to the drawings with more specificity, the present invention essentially provides a wheelchair transport apparatus as at 10 for transporting a wheelchair 11 by way of a motorized, tadpole-configured tricycle as at 12. Notably, a motorized tricycle's wheels may be arranged in either a delta type configuration or a tadpole type configuration. A so-called delta trike has one wheel in front and two in back, and the so-called tadpole trike has two wheels in front and one in back.

Viewed systemically, the present invention may be thought of or regarded as a combination invention with a motorized tadpole style tricycle or trike 12 as may be exemplified by the Can-Am Spyder Roadster. The Can-Am Spyder Roadster (or Spyder) is a three-wheeled tadpole type motorcycle manufactured by Bombardier Recreational Products. The vehicle has a single rear drive wheel (as at 14) and two laterally opposed wheels (as at 13) in front for steering. The manufacturer refers to it as a roadster, but in technical terms it is more of what has been traditionally called a trike. The three-wheel configuration with two wheels 13 in the forward position and one wheel 14 in the rearward position provides a uniquely stable footing and arrangement for wheelchair transport.

Accordingly, the preferred motorized vehicle usable in combination with the apparatus 10 is a tadpole-configured or tadpole style motorized tricycle 12. The tadpole-configured motorized tricycle or trike 12 preferably comprises two laterally opposed front wheels 13, a rear wheel 14, a lateral trike plane as at 100, a maximum left lateral trike extent as at 101, a maximum right lateral trike extent as at 102, and a trike weight as at 103. The maximum left and right lateral trike extents 101 and 102 are equidistant distant from the lateral trike plane 100 at a select extent distance 104.

The wheelchair transport apparatus 10 is attachable to the trike 12 in a rearward position relative to the front wheels 13 for stowage and transport as may be seen from a general and comparative inspection of FIG. 5-9. Whether attached to the left or right lateral side of the trike 12, the preferred maximum lateral apparatus extent (as at 106) does not extend beyond either maximum left lateral trike extent 101 or the maximum right lateral trike extent 102. In this regard, the distance 107 from the lateral plane 100 to the maximum lateral apparatus extent 106 should preferably be less than or equal to (i.e. no greater than) the distance 104 so as not to significantly alter the driving characteristics of the trike 12 during transport operations.

The wheelchair transport apparatus 10 preferably comprises an apparatus-to-tricycle main frame or interface assembly; a chair-to-interface pivot assembly; a pivot-to-interface lever arm assembly as at 43; a maximum width or the maximum lateral apparatus extent 106 mentioned above; and an apparatus weight as at 108. As further specified, the maximum lateral apparatus extent 106 or distance 107 is preferably less than or equal to (i.e. no greater than) the distance 104. Further, the apparatus weight 108 is significantly less than the trike weight 103 so as not to alter the driving characteristics of the trike 12.

The main frame or interface assembly preferably comprises an elongate frame member as at 15 and attachment means for attaching the frame member 15 to various portions or sections of the trike body or construction. The frame member 15 preferably comprises an inverted, transversely U-shaped channel structure or construction as at 24 as perhaps may be best seen in FIG. 15. The attachment means preferably comprise three fastener-receiving attachment sites 28, 29, and 33 as generally depicted in FIG. 12-16.

The three fastener-receiving attachment sites 28, 29, and 33 comprise three fastener-receiving structures defining three fastener-alignment axes as at axis 112, axis 113, and axis 114. The fastener-alignment axes 112-114 together and variously extend in space for preventing rotation of the main frame or interface assembly about a select fastener-alignment axis (as selected from the group consisting of axes 112, 113, and 114) as fastened to the trike 12 via a series of three fastener assemblies.

A first fastener assembly is depicted at 21, a second fastener assembly is depicted at 22, and a third fastener assembly is depicted at 23. The fastener assemblies 21-23 are preferably exemplified by nut/bolt assemblies. The fastener assemblies 21-23 basically function to fasten the main frame or interface assembly to the motorized tricycle or trike 12, and as indicated are so fastened so as to prevent structural rotation about any of the axes 112-114.

In this regard, the reader will note that the first fastener-alignment axis 112 and the second fastener-alignment axis 113 are substantially parallel to one another in an upper plane or positions, while the third fastener-alignment axis 114 is orthogonal to the first and second fastener-alignment axes 112 and 113 in a lower position. To achieve this structural fastening arrangement, the main frame or interface assembly preferably comprises an arcuate upper attachment arm construction 25, which upper attachment arm construction 25 extends intermediate the first and second fastener-alignment axes 112 and 113 and the frame member 15 in a lateral direction toward the trike 12 for laterally spacing the first and second fastener-alignment axes 112 and 113 from the U-shaped channel 24.

The upper attachment arm construction 25 thus functions to simultaneously laterally space the frame member 15 of the wheelchair transport apparatus 10 from the motorized tricycle 12 and structurally attach the frame member 15 to the motorized tricycle 12. The upper attachment arm construction 25 comprises an arcuate upright arm portion as at 26, and a laterally extending arm portion as at 27. At laterally opposed portions of the arm portion 27 are arm-to-seat attachment sites as at 28 and 29 respectively.

The attachment site 28 is essentially an upper terminus of the arm portion 26 that attaches to a first or left side portion 31 of an under-seat bracket structure 30 of the motorized tricycle 12, and the attachment site 29 is essentially an upwardly extending terminus that attaches to a second or right side portion 32 of said under-seat bracket structure 30. The attachment sites 28 and 29 both comprise fastener-receiving apertures 33 for receiving the fastener assemblies 21 and 22 and defining the axes 112 and 113.

A third attachment site or structure is preferably exemplified by an angle bracket as at 33, which angle bracket 33 comprises a lower frame member attachment portion 36 and an upper frame attachment portion 37. The attachment portion 36 is attached to the frame member 15, and the attachment portion 37 comprises a fastener-receiving aperture as at 34 for defining the axis 114 and receiving the fastener assembly 23.

The angled bracket 33 attaches the frame member 15 to a lower main frame portion 35 of the motorized tricycle 12. In combination with the attachment sites 28 and 29, the third attachment site or angle bracket 33 completes the fitting attachment series of the main frame or interface assembly to the trike 12. All three attachment sites 28, 29, and 33 may further comprise added bracketing hardware (not specifically illustrated) attached to the sites to structurally reinforce the sites, as discussed briefly hereinafter.

The attachment points or sites chosen for the lift apparatus were basically chosen based on simplicity of design. The manufacturer of the Spyder (as well as manufacturers of many different brands of motorized cycles) pre-installs many mounting locations on its motorized cycles for future accessories. The lift apparatus 10 is designed to be attached to the motorized trike 12 via at least three sites (as at sites 28, 29, and 33), but possibly or preferably four mounting hole locations total.

A first (lower site as exemplified by) site 33 is preferably defined by the left side foot peg accessory mounting hole or aperture. The second and third sites (as exemplified by upper sites) 28 and 29 may be typified by two mounting brackets with one fastener-receiving hole or aperture in each under the passenger seat. Typically this area is used to mount trailer hitches to the motorcycle.

A fourth site (not specifically illustrated) is straight through the main frame tubing of the motorized tricycle. This is not a typical mounting spot but the manufacture already has a hole going straight through frame. This fourth mounting location is achieved by fashioning a bracket to mount to one of the under seat brackets (as at 31) and then to the side of the frame tubing. This fourth location may be added to ensure the lift apparatus stays secured to motorized trike 12 even if the trike 12 is involved in an accident.

The chair-to-interface pivot assembly preferably comprises a pivot arm assembly and a chair-support assembly. The pivot arm assembly preferably comprises a forward pivot arm as at 16, a rearward pivot arm as at 17, and means (e.g. pivot-enabling hardware 18 cooperably outfitted upon the frame member 15 and arms 16/17) for pivotally attaching the forward and rearward pivot arms 16 and 17 to the frame member 15 of the main frame or interface assembly. The means for pivotally attaching the arms 16 and 17 thus provide a pair or parallel upper pivot axes as at 109.

The reader will note that the pivot arms 16 and 17 are preferably parallel to one another and recall that the frame member 15 preferably comprises a transversely inverted U-shaped channel structure or construction as at 24. The pivot arms 16 and 17 preferably comprise outer arm surfacing, which outer arm surfacing is receivable in the U-shaped channel structure 24 when moving from a chair-lowered position to a chair-raised position. In other words, the arms are pivotally connected or fastened to the channel construction 24 as received therewithin, and when pivoted about the axes 109, further portions of the arms 16 and 17 are received within the channel space 38 of the channel construction 24.

The chair-support assembly preferably comprises a forward support member 19, a rearward support member 19, and means (e.g. pivot-enabling hardware 61 cooperably outfitted upon the forward and rearward support arms 19/20 and arms 16/17) for pivotally and respectively attaching the forward and rearward support members 19 and 20 to the forward and rearward pivot arms 16 and 17. The pivot-enabling hardware 61 thus provides a pair or lower pivot axes 110. The support members 19 and 20 are coaxial with the pair of lower pivot axes as at 110.

The reader will note that the support members 19 and 20 are preferably parallel to one another. Together, the parallel pivot arms 16 and 17, and the parallel support members 19 and 20 enhance fluid or uniform motion of the pivot assembly and chair support assembly mechanisms during apparatus lowering and raising events, as well as during transport of the apparatus-supported wheelchair 11.

The chair support assembly may further preferably comprise certain means for maintaining the support members 19 and 20 in parallel relation one another for further enhancing the fluid motion and strength of the arrangement, said means comprising a medial member as at 39 and a lateral member as at 40. The medial and lateral members 39 and 40 are preferably parallel and extend intermediate and interconnect the forward and rearward support members 19 and 20.

Each of the members 39 and 40 further has a vertical dimension as at 115 for providing chair-stop structure, or for preventing a supported wheelchair 11 from displacing medially and laterally during transport. The inner surfacing or chair-opposing surfacing 41 of the members 39 and 40 may preferably be lined with certain polymeric or plastic materials for preventing damage to or chafing of the wheelchair 11.

The lever arm assembly 43 is preferably attached (e.g. via fasteners 42) to the forward pivot arm 16. The lever arm assembly 43, the pivot arms 16 and 17, and the support members 19 and 20 are positionable intermediate the chair-lowered position (as generally depicted in FIGS. 1, 5, 7, and 10; and the chair-raised position (as generally depicted in FIGS. 2-4, 6, 8, 9, and 11. As may be seen from a comparative inspection of the noted figures, the pivot arms 16 and 17 rotate about the upper and lower pivot axes 109 and 110 such that the upper pivot axes 109 are fixed relative to the frame member 15, and the lower pivot axes translate through space relative the frame member 15.

The lever arm assembly 43 preferably comprises an angled arm portion and a telescopic (or extendable-retractable) lifting arm as at 44. The angled arm portion preferably comprises two angles as at 57 and 58 intermediate three angle arm sections as at 59, 60, and 62. Angle 57 angles the arm section 59 vertically relative to arm section 60, and angle 58 angles arm section 62 laterally relative to arm section 60. The structural configuration of the angled arm portion enables functionality of the telescopic lifting arm 44.

Figure 3:
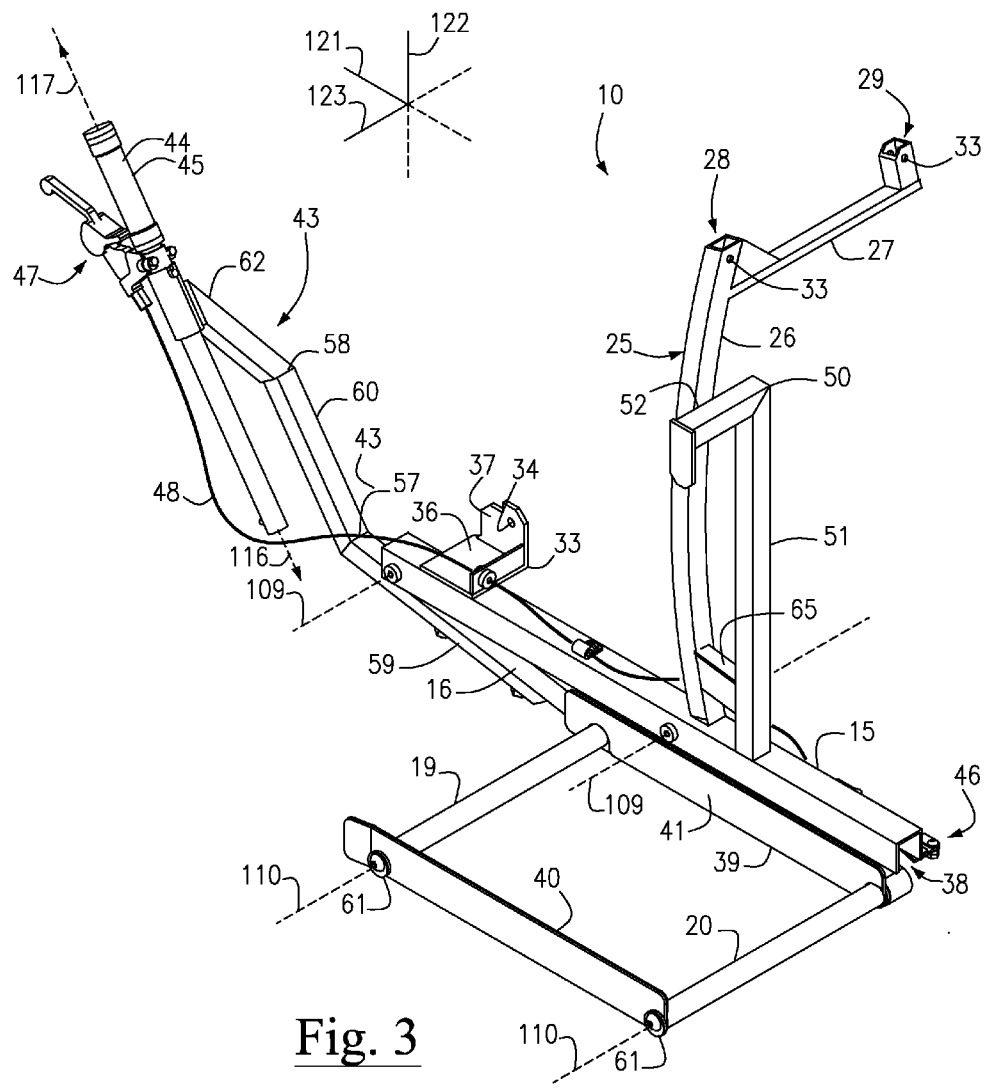
FIG. 3 is a third top rear perspective view of the preferred wheelchair transport apparatus according to the present invention, showing the wheelchair transport apparatus in a second chair-supporting raised position with an extendable lift arm in a retracted position.
Figure 4:
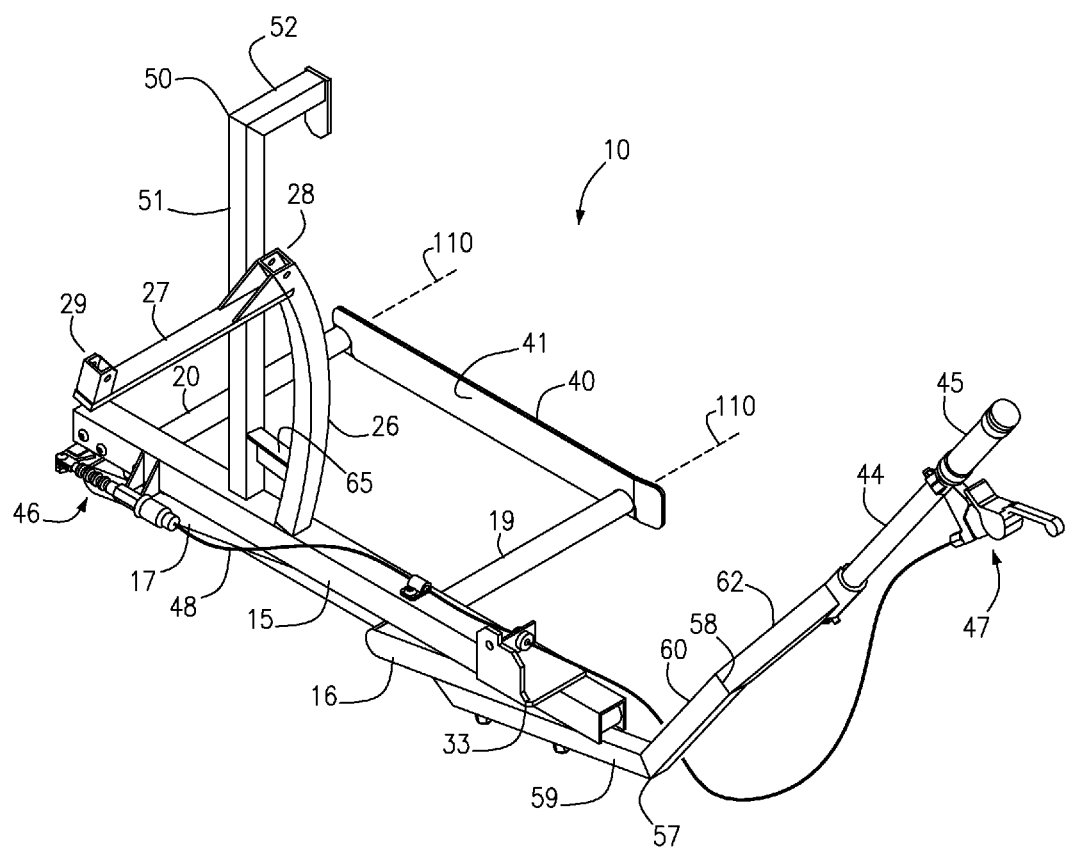
FIG. 4 is a first top frontal perspective view of the preferred wheelchair transport apparatus according to the present invention, showing the wheelchair transport apparatus in the first chair-supporting raised position with the extendable lift arm in the extended position.
Figure 5:
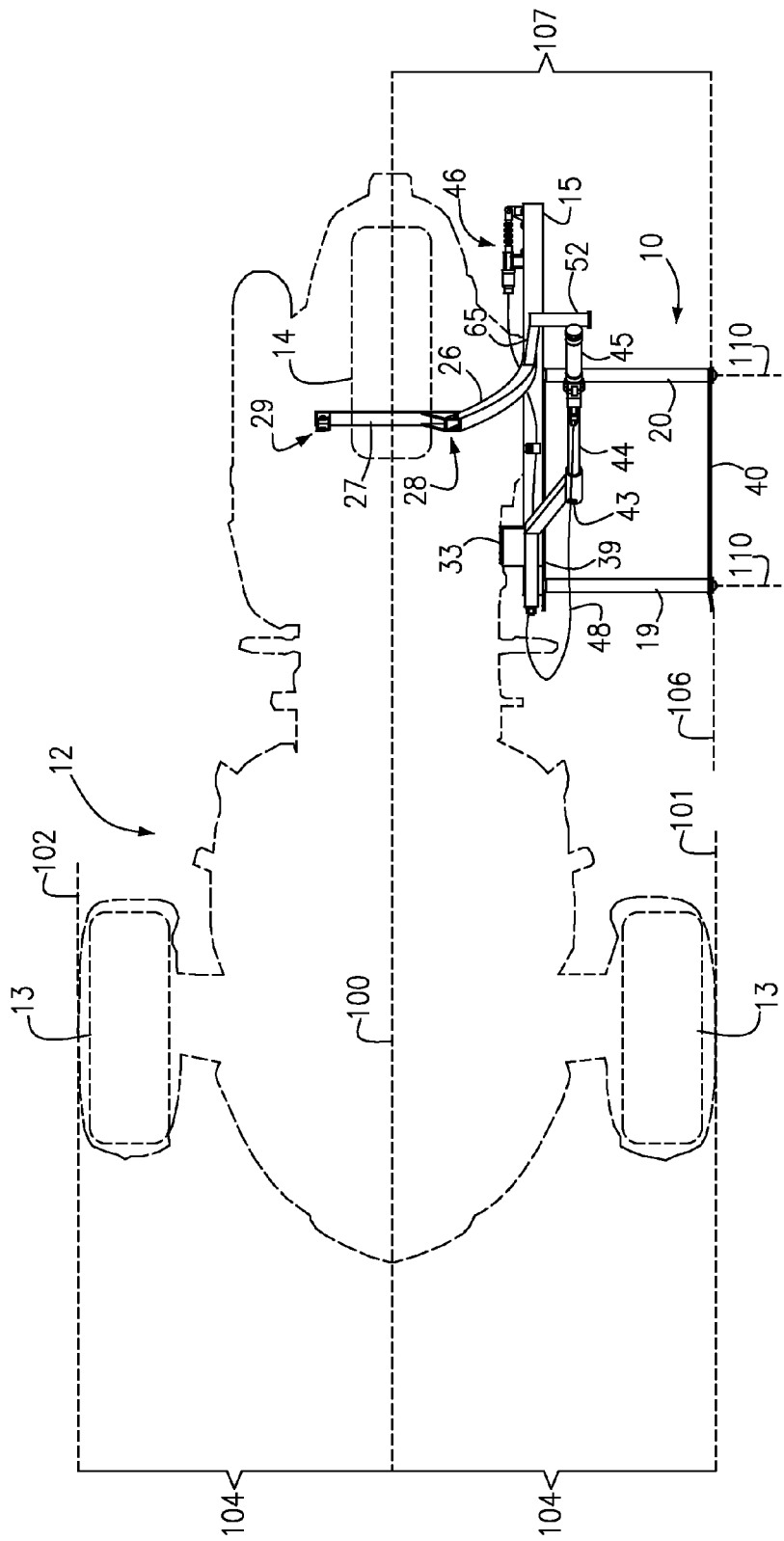
FIG. 5 is a first top plan view of the preferred wheelchair transport apparatus according to the present invention, depicting the wheelchair transport apparatus in the chair-receiving lowered position as structurally positioned adjacent a diagrammatic outline of a tadpole-configured motorized tricycle.
Figure 6:
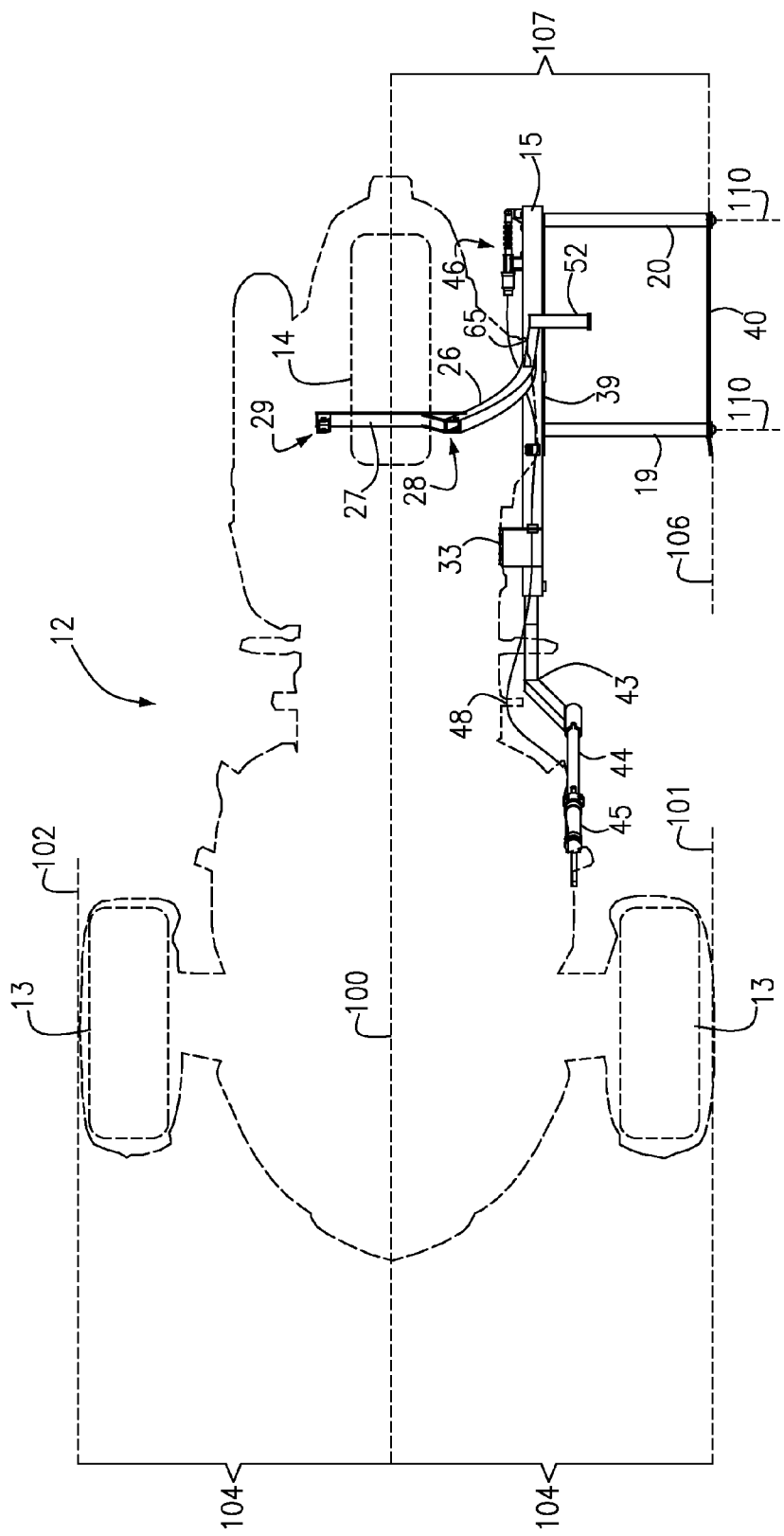
FIG. 6 is a second top plan view of the preferred wheelchair transport apparatus according to the present invention, depicting the wheelchair transport apparatus in the first chair-supporting raised position as structurally positioned adjacent a diagrammatic outline of a tadpole-configured motorized tricycle.
Figure 7:
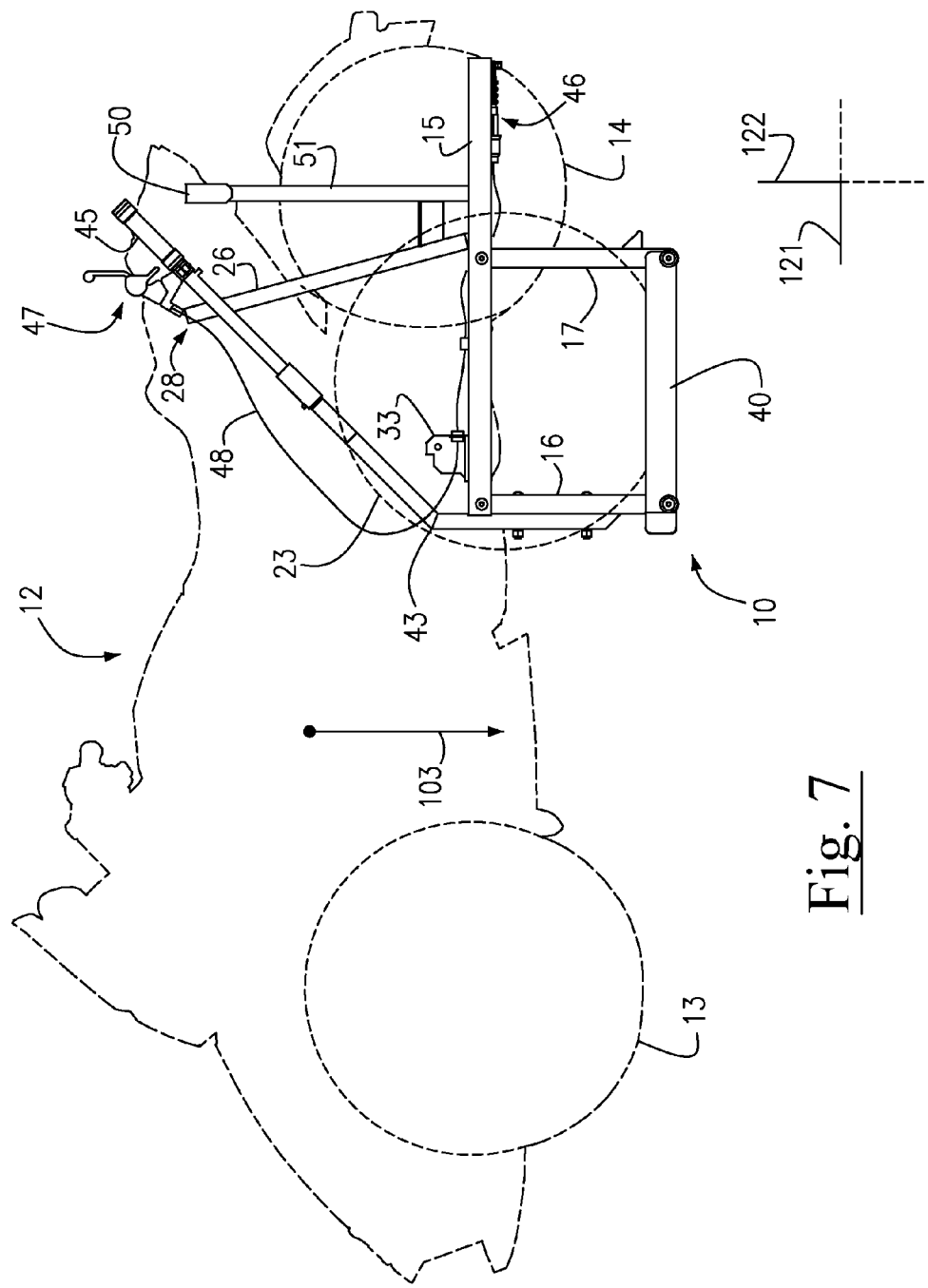
FIG. 7 is a first side elevational view of the preferred wheelchair transport apparatus according to the present invention, depicting the wheelchair transport apparatus in the chair-receiving lowered position as structurally positioned adjacent a diagrammatic outline of a tadpole-configured motorized tricycle.
Figure 8:
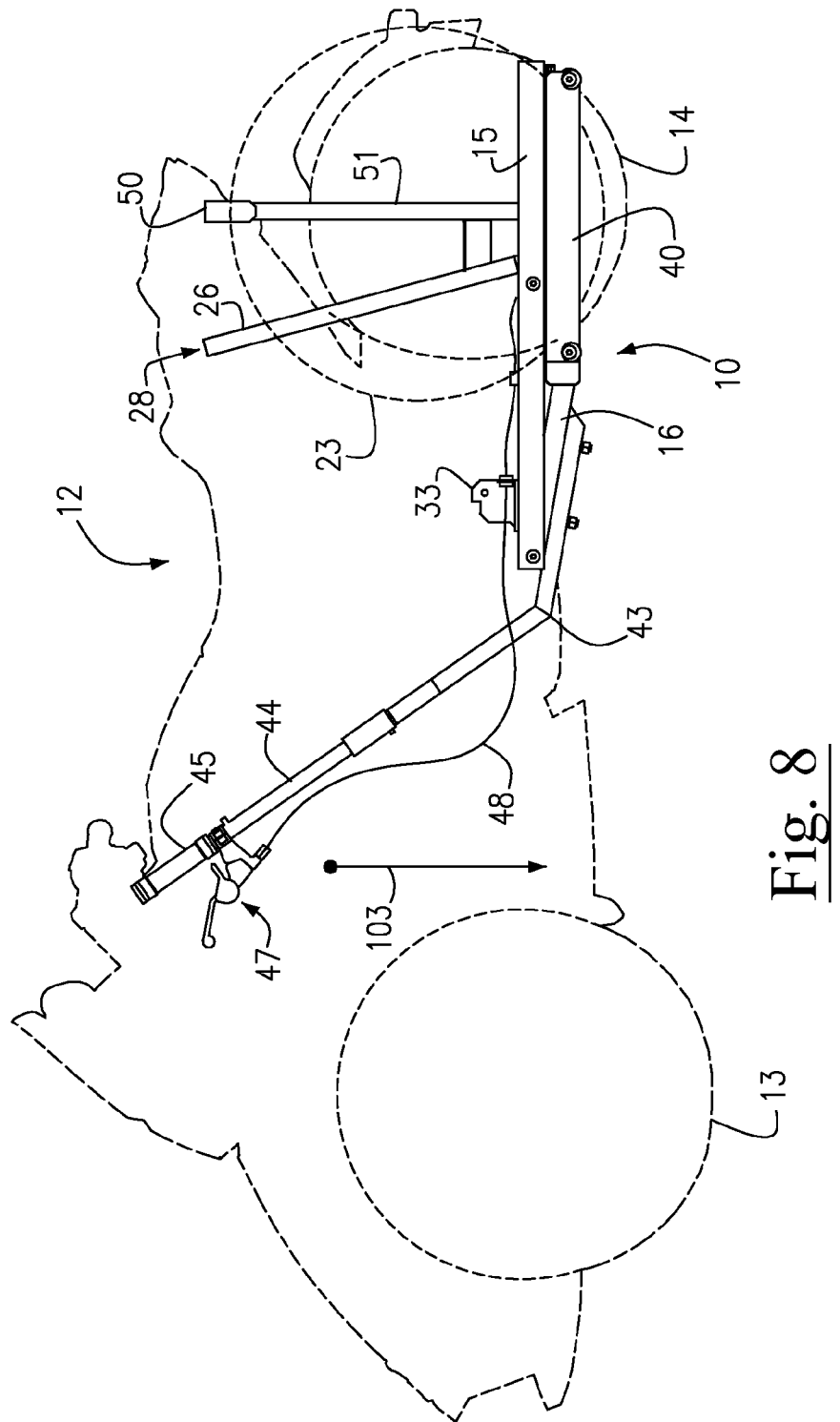
FIG. 8 is a second side elevational view of the preferred wheelchair transport apparatus according to the present invention, depicting the wheelchair transport apparatus in the first chair-supporting raised position as structurally positioned adjacent a diagrammatic outline of a tadpole-configured motorized tricycle.
Figure 9:
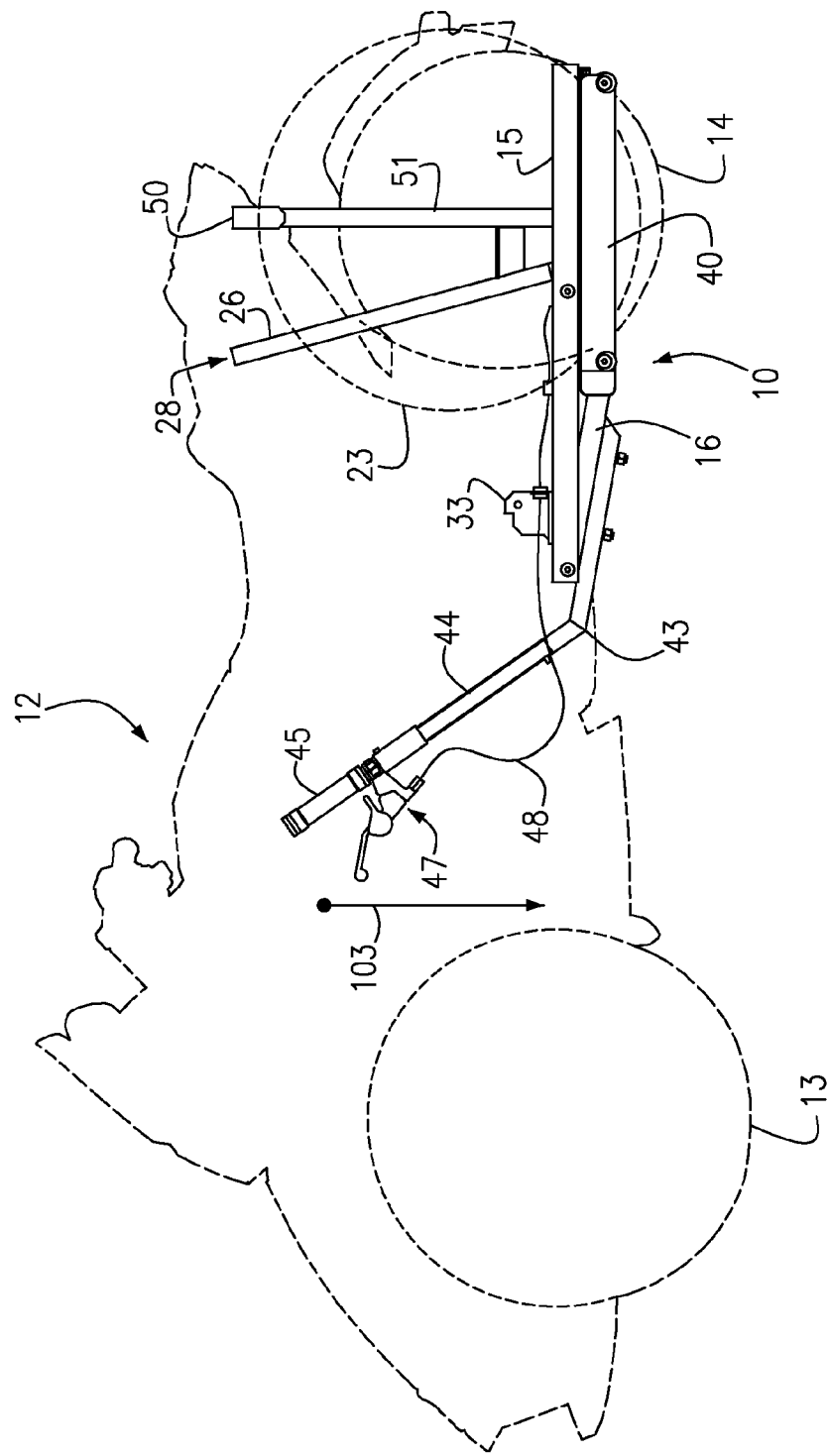
FIG. 9 is a third side elevational view of the preferred wheelchair transport apparatus according to the present invention, depicting the wheelchair transport apparatus in the second chair-supporting raised position as structurally positioned adjacent a diagrammatic outline of a tadpole-configured motorized tricycle.
Figure 10:
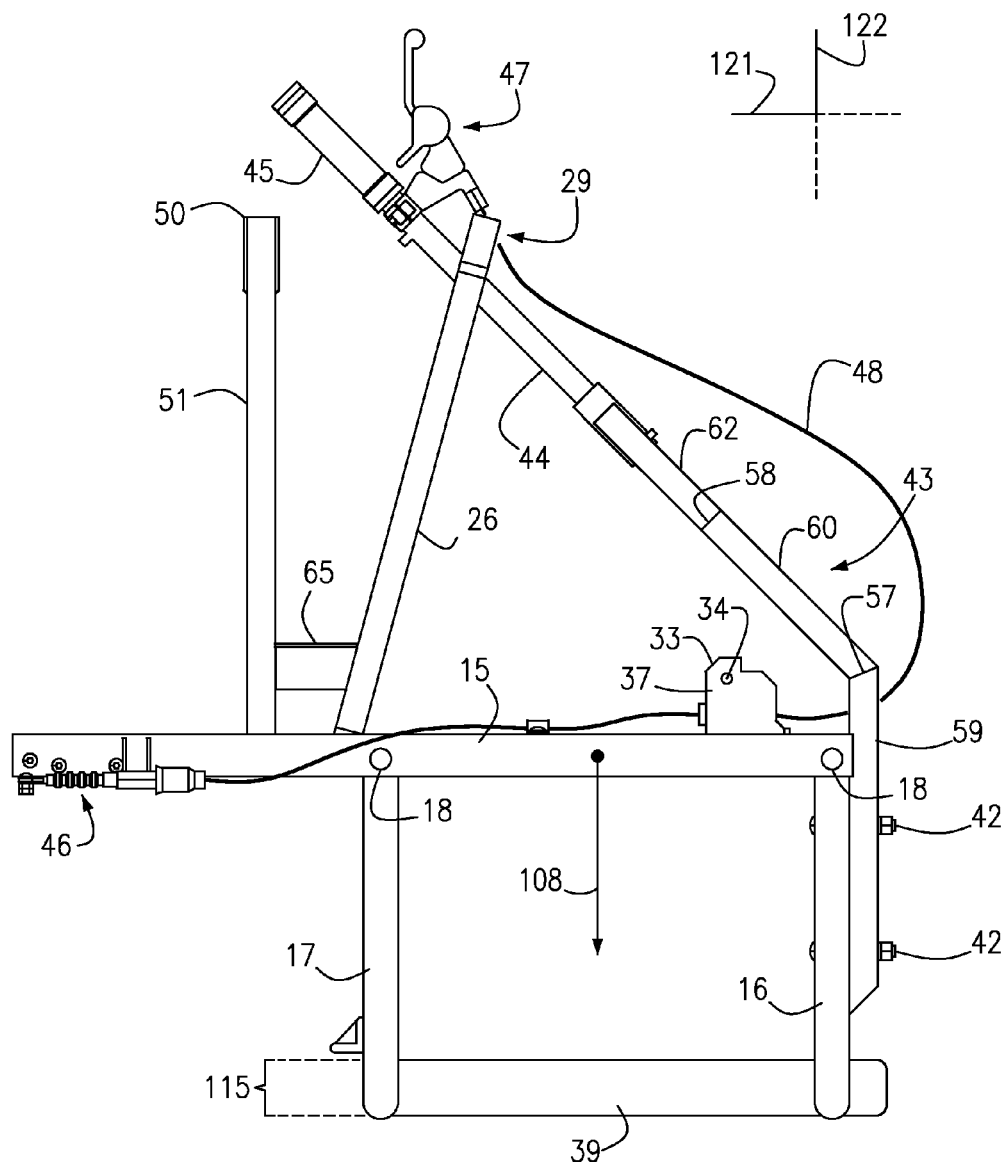
FIG. 10 is a fourth side elevational view of the preferred wheelchair transport apparatus according to the present invention (laterally opposite the first side elevational view depicted in FIG. 7), depicting the wheelchair transport apparatus in the chair-receiving lowered position.
Figure 11:
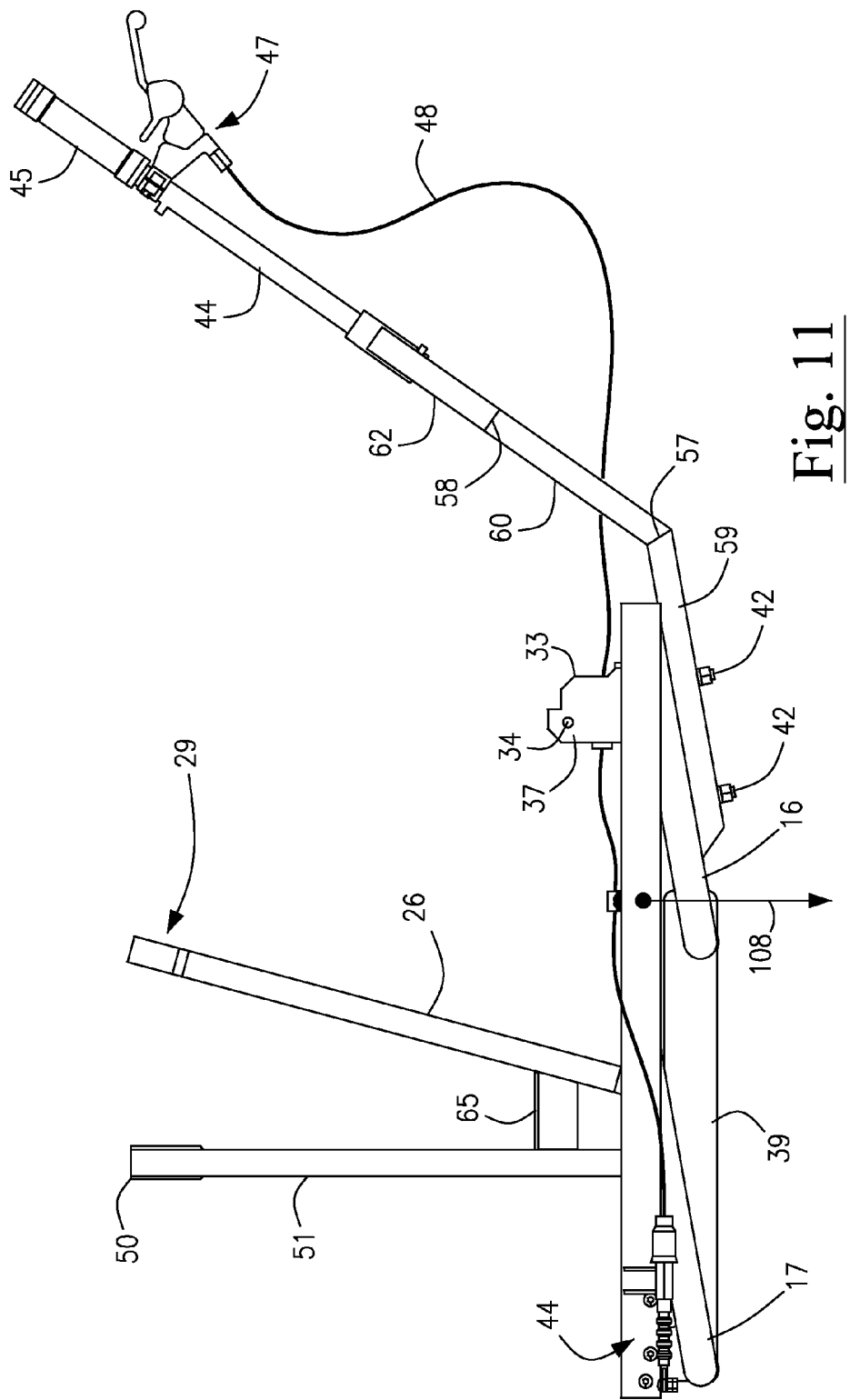
FIG. 11 is a fifth side elevational view of the preferred wheelchair transport apparatus according to the present invention (laterally opposite the first side elevational view depicted in FIG. 8), depicting the wheelchair transport apparatus in the first chair-supporting raised position.
Figure 12:
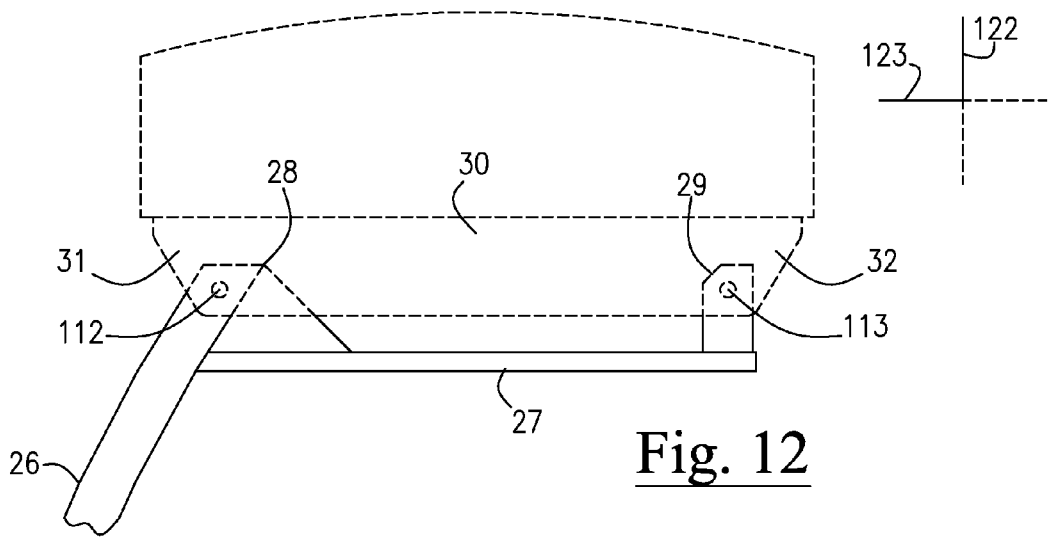
FIG. 12 is a rear enlarged fragmentary depiction of an upper portion of an upper arm attachment construction according to the present invention positioned in inferior adjacency to a prior art seat-bracket assembly of a motorized tricycle for attachment thereto.
Figure 13:
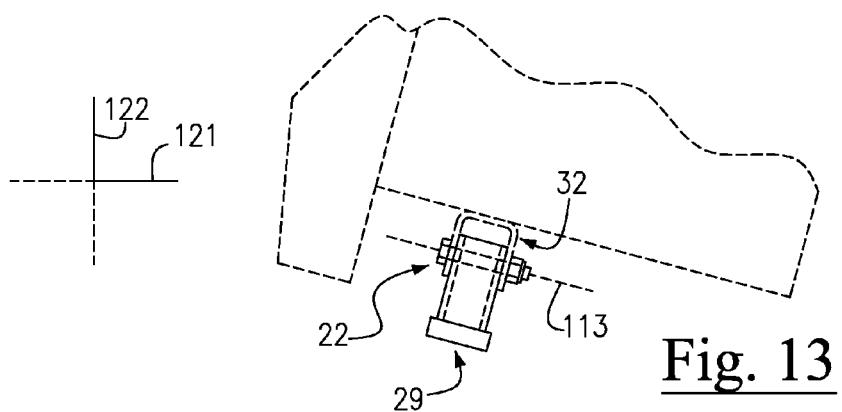
FIG. 13 is a first lateral enlarged fragmentary depiction of a first attachment site of the upper portion of an upper arm attachment construction according to the present invention as attached to the prior art seat-bracket assembly of a motorized tricycle.
Figure 14:
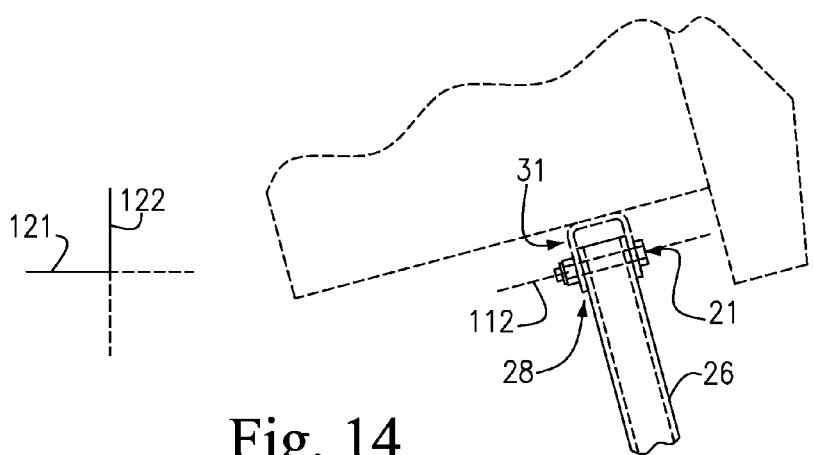
FIG. 14 is a second lateral enlarged fragmentary depiction of a second attachment site of the upper portion of an upper arm attachment construction according to the present invention as attached to the prior art seat-bracket assembly of a motorized tricycle.
Figure 15:
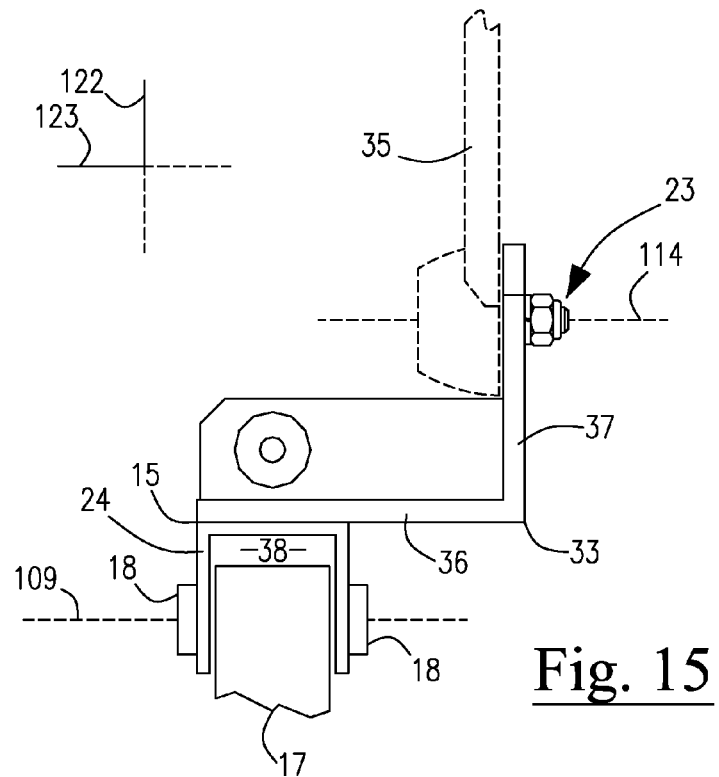
FIG. 15 is a longitudinal enlarged fragmentary depiction of a third attachment site of a lower angled bracket construction according to the present invention as attached to the prior art lower body portion of a motorized tricycle.
Figure 16:
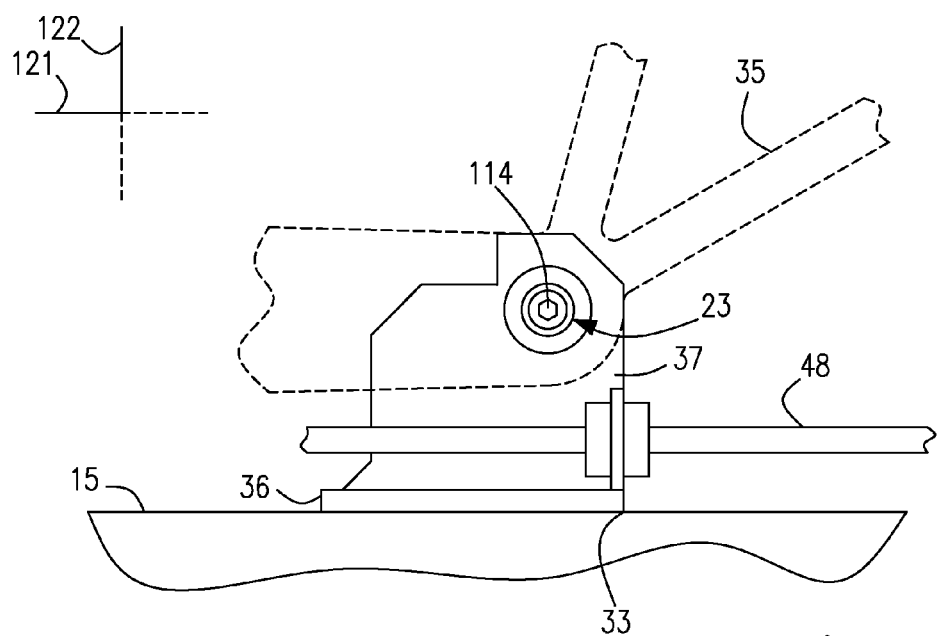
FIG. 16 is a lateral enlarged fragmentary depiction of the third attachment site of the lower angled bracket construction according to the present invention as attached to the prior art lower body portion of a motorized tricycle.

The telescopic lifting arm 44 (a) is extendable (as at vector 117) as generally depicted in FIGS. 1, 2, 4-8, 10, and 11 for increasing torque when moving the apparatus 10 from the chair-lowered to chair-raised position, and (b) is retractable (as at vector 116) as generally depicted in FIGS. 3 and 9 essentially for removing the arm 44 as a structural obstruction to the user/operator/rider when the apparatus 10 is in the chair-raised position.

The lifting arm 44 may be preferably outfitted with a handle bar grip as at 45 for enhancing the user's ability to manually grip and move the apparatus 10 from the from the lower to raised positions via the lever arm assembly 43. Further, the lever arm assembly 43 and/or the apparatus 10 may be outfitted with a latch assembly as at 46, and an ASV folding lever assembly as at 47 with a cable 48 leading from the lever assembly 47 to the latch assembly 46. The latch assembly 46 and lever assembly 47, inclusive of the force-transmitting cable 48, basically function to prevent accidental release of the pivot arms 16 and 17, and support members 19 and 20 from the chair-raised position to the chair-lowered position.

The support members 19 and 20 are raised to the chair-raised position from the chair-lowered position when the lever arm assembly 43 is moved from the rearward, chair-lowered position to the forward, chair-raised position. A wheelchair 11 is received upon the support members 19 and 20 via the wheel(s) 23 of the wheelchair 11. The chair-raised position is used to transport the wheelchair 11 having a wheelchair weight (as at 111) as supported upon the support arms 19 and 20.

Figure 17:
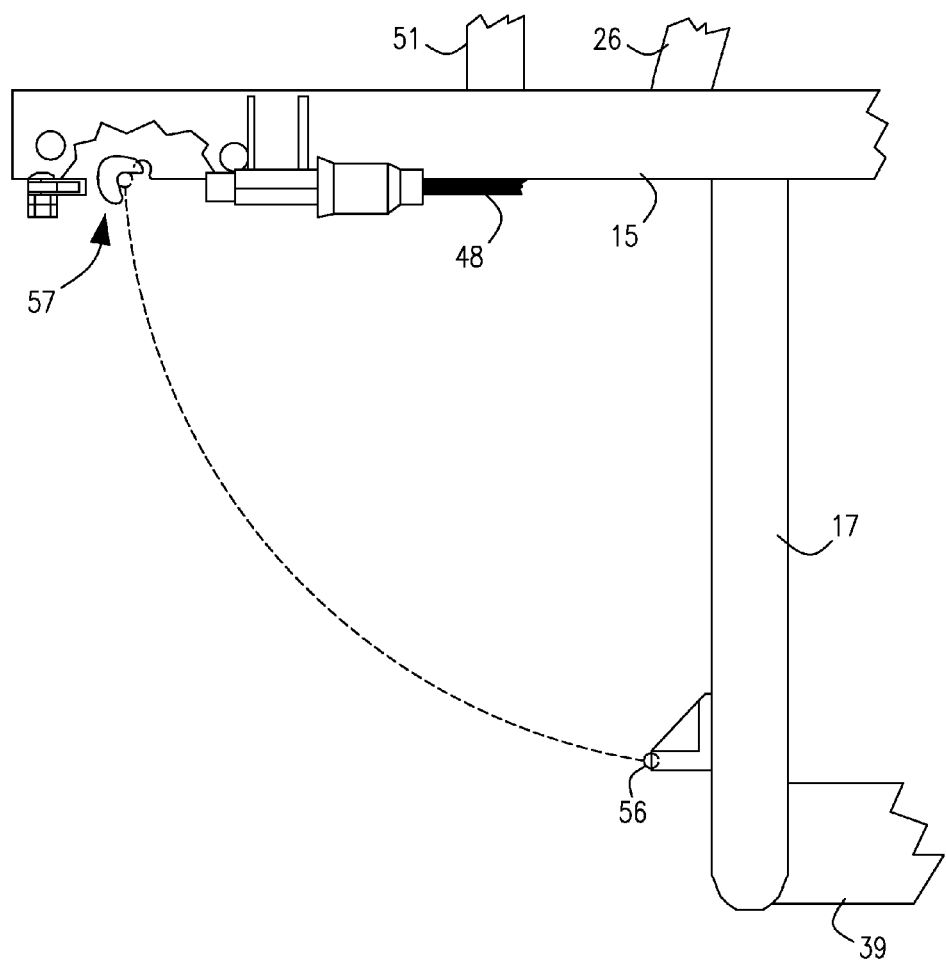
FIG. 17 is a first sequential fragmentary diagrammatic depiction of the latching mechanism of the wheelchair transport apparatus according to the present invention showing the overall pathway of a pin element receivable by pin-receiving elements of a latch assembly received within a U-shaped channel construction with certain parts of the U-shaped channel construction being broken away to show the pin-receiving elements of the latch assembly.
Figure 18:
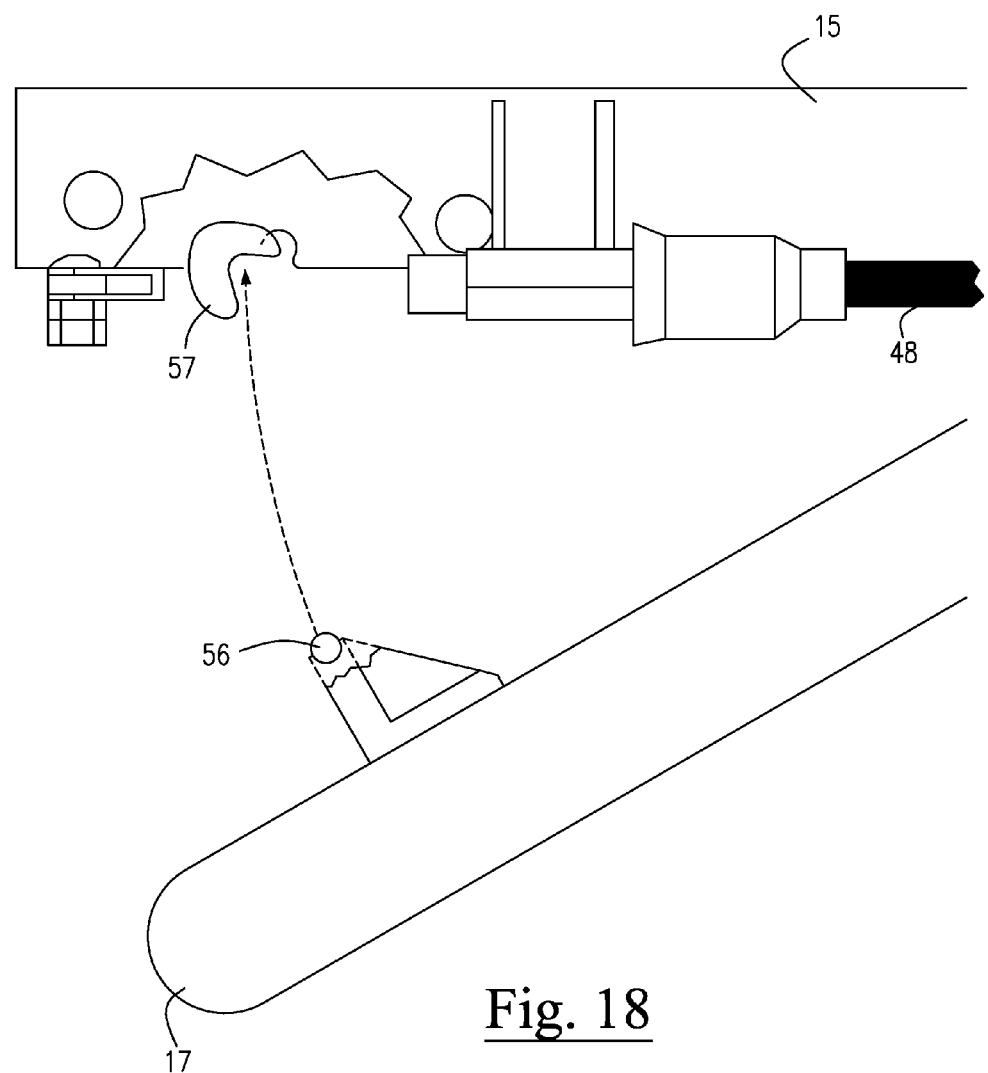
FIG. 18 is a second enlarged sequential fragmentary diagrammatic depiction of the latching mechanism of the wheelchair transport apparatus according to the present invention showing the pin element drawing near the pin-receiving elements of the latch assembly.
Figure 19:
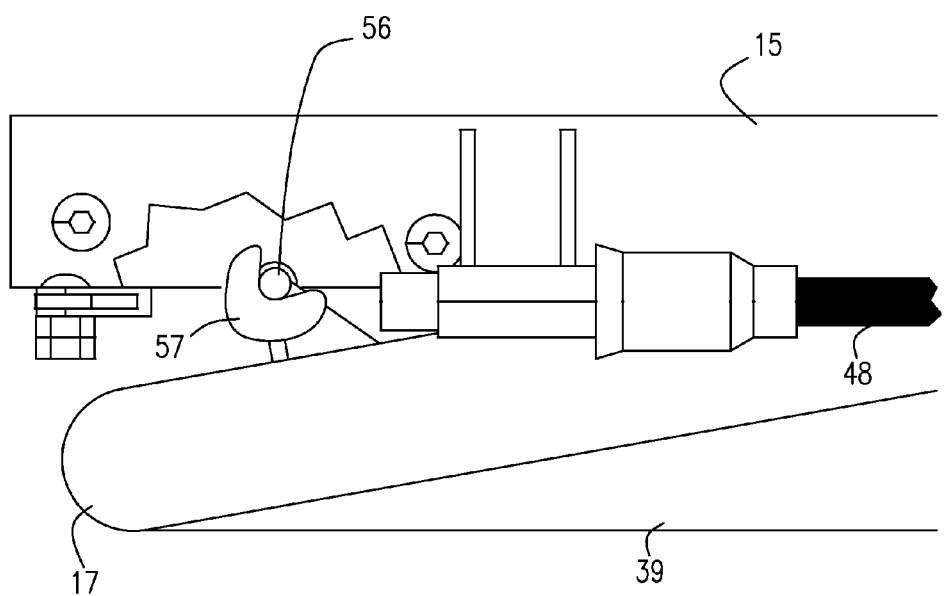
FIG. 19 is a third enlarged sequential fragmentary diagrammatic depiction of the latching mechanism of the wheelchair transport apparatus according to the present invention showing the pin element received by the pin-receiving elements of the latch assembly.

The chair-raised position is maintained primarily by virtue of the latch mechanism or assembly 46 as depicted in a sequential and comparative diagrammatic manner in FIG. 17-19. A pin element 56 is attached to the rearward pivot arm 17, which pin element 56 is secured by the pin-receiving elements 57 of the latch assembly 46. The pin-receiving elements 57 are otherwise hidden by the U-shaped channel construction 24 from passersby.

Accordingly, FIG. 17-19 depict parts of the U-shaped channel construction 24 broken away to basically show the pin-receiving elements 57 receiving and supporting the pin element 56. The pin-receiving elements 57 release the pin element 56 via manual engagement of the lever (release) assembly 47 (and force transmission via the cable 48). The latch assembly 46 is preferably exemplified by a double locking automobile style latch, to retain the lift or wheel chair support apparatus 10 in the upright, raised or stowed position.

The apparatus 10 may further preferably comprise an L-shaped chair-spacer construction as at 50. The chair-spacer construction 50 comprises an upright spacer portion 51, and a lateral spacer portion 52. The upright spacer portion 51 extends vertically from the frame member 15, and the lateral spacer portion 52 extends laterally from the upright spacer portion 51 (in a direction opposite the arcuate arm portion 26).

The upright spacer portion 51 may be preferably interconnected with the arcuate arm 26 by an angle member 65 for adding strength the portion 51 and arm 26. The lateral spacer portion 52 basically functions to structurally space an upper chair portion 53 of the supported wheelchair 11 from the upright portion 51 such that a medial wheel (assembly) 23 of the supported wheelchair 11 is received in inferior adjacency to the lateral spacer portion 52 and in lateral adjacency to the upright spacer portion 51.

Figure 20:
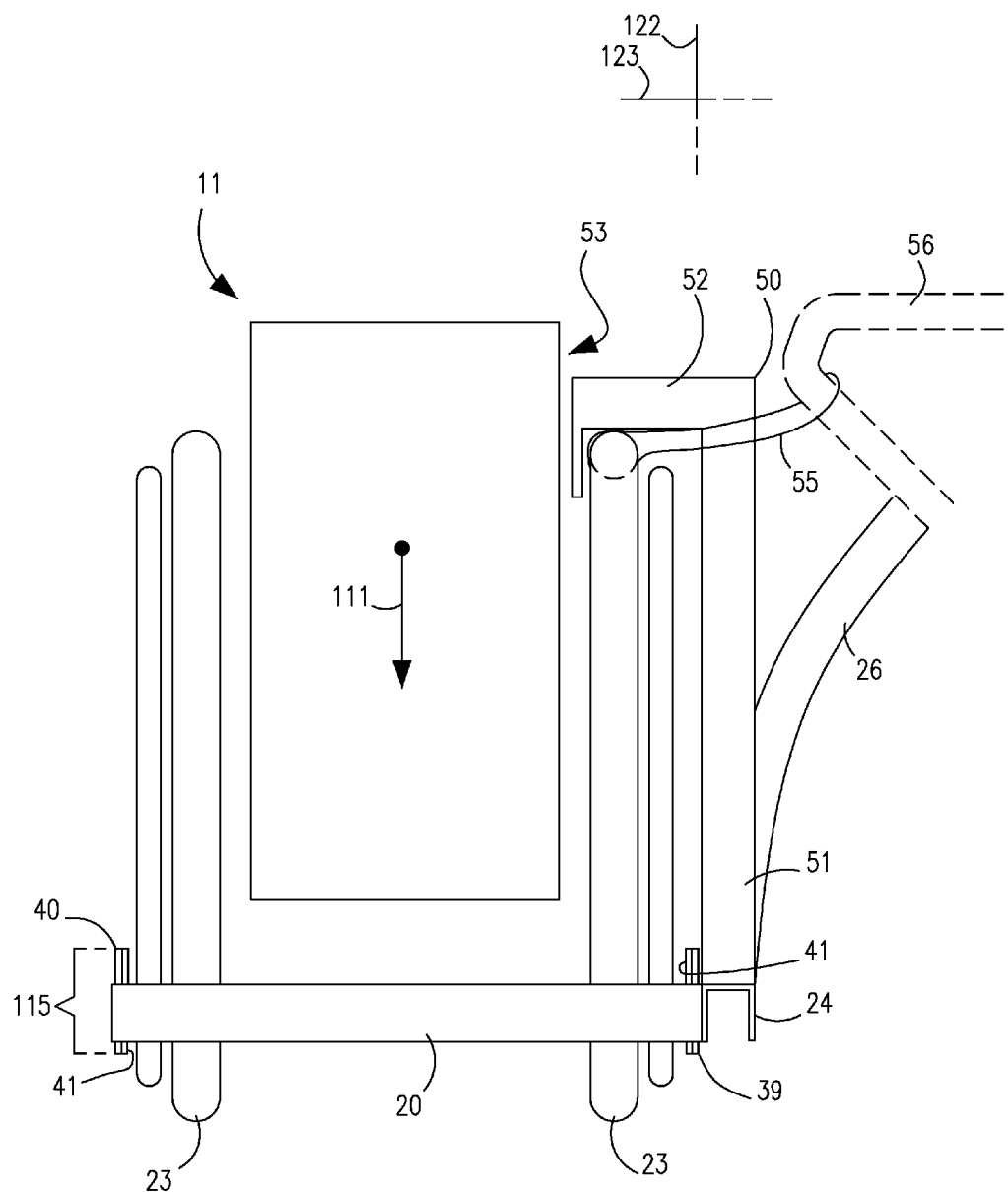
FIG. 20 is a rear elevational depiction of a diagrammatic wheelchair supported by the support members according to the present invention as depicted in lateral adjacency to a fragmentary diagrammatic outline of a portion of a motorized tricycle.

It is thus believed that the L-shaped spacer construction 50 may well function to enhance securement of the supported wheelchair 11 to the wheelchair transport apparatus 10. In this regard, the reader will further note from an inspection of FIG. 20 that the present invention may be further used in combination with at least one heavy duty VELCRO brand hook and loop fastening strap as at 55.

The strap 55 may be looped around the medial wheel assembly 23 and a passenger handle portion 56 of the trike body and tensioned so as to pull the supported wheelchair 11 against the lateral spacer portion 52 for added securement. A second heavy duty VELCRO brand hook and loop fastening strap (not specifically illustrated) may be utilized to laterally compress the wheelchair 11 before supporting the wheelchair 11 upon the support members 19 and 20.

The apparatus weight 108 and the wheelchair weight 111 together sum to less than the trike weight 103, and thus the trike weight 103 and three wheel stance of footprint of the trike 12 maintain the apparatus 10 and wheelchair 11 as supported by the apparatus 10 in the chair-raised position during transport without causing the trike 12 to tip or rotate via the combined downwardly directed weights 108+111 off the lateral plane 100 of the trike 12.

In other words, the trike weight 103 and the maximum left and right lateral trike extents 101 and 102 maintain the apparatus 10 and a supported wheelchair 11 in a uniform vertical position (i.e. the chair-raised position) during transport or travel of the trike 12. The wheelchair transport system, inclusive of the trike 12 and the apparatus 10, thus effectively functions to transport a supported wheelchair 11 by way of said motorized tricycle 12 and wheelchair transport apparatus 10.

Summarizing the operations, the apparatus 10 is initially positioned in the chair-lowered position as generally depicted in FIGS. 1, 5, 7, and 10. The telescoping lever arm 44 is extended to the arm-extended position as also generally depicted in FIGS. 1, 5, 7, and 10. The user/operator (e.g. a disabled person) transfers his or her person from a wheelchair 11 to the motorized tricycle 12. The user or operator may then laterally compress the wheelchair via the (second) VELCRO brand hook and loop fastening discussed hereinabove.

The user and/or operator may then roll the wheelchair 11 onto the support members 19 and 20 of the lift apparatus 10, and the wheelchair brakes (not specifically illustrated) may be applied to prevent the wheels 23 of the supported wheelchair 11 from turning about their axis of rotation. The user/operator may then push forward and down on the lever arm assembly 43 until the chair support assembly locks into the stowed position via pivotal movement of the pivot arm assembly and latch mechanism 46.

The user/operator may then push or retract the telescopic lever arm 44 into the retracted position as depicted in FIGS. 3 and 9, and/or further strap secure the supported wheelchair 11 to the passenger handle portion 56 on the motorized tricycle 12 as discussed hereinabove. Once so secured, the wheelchair 11 is ready to be transported by the motorized tricycle 12 as driven by the user/operator. The main frame components of the apparatus 10 are all preferably constructed from 304 or 316 type stainless steel, and the material construction of the fastening hardware and bushings is preferably stainless steel and/or brass.

While the foregoing specifications set forth much specificity, the same should not be construed as setting forth limits to the invention but rather as setting forth certain preferred embodiments and features. For example, it is contemplated that the foregoing specifications basically support or teach a transport apparatus for use with a motorized tricycle, which transport apparatus essentially comprises a main frame a pivot assembly, and a lever arm assembly.

The main frame comprises an elongate frame member extending in a first dimension as at 121 and attachment means for attaching the frame member to a motorized tricycle. The pivot assembly comprises a pivot arm assembly and a chair support assembly. The pivot arm assembly comprises a forward pivot arm, a rearward pivot arm and means for pivotally attaching the forward and rearward pivot arm to the main frame via a pair of upper pivot axes. The pivot arms extend in a second dimension as at 122.

The chair support assembly comprises a forward support member, a rearward support member and means for pivotally and respectively attaching the forward and rearward support members to the forward and rearward pivot arms. The support members are coaxial with a pair of lower pivot axes and extend in a third dimension as at 123.

The lever arm assembly is attached to the forward pivot arm, and the lever arm assembly, the pivot arms, and the support arms are positionable intermediate a chair-lowered position and a chair-raised position. The pivot arms rotate about the upper and lower pivot axes, and the support members are raised to the chair-raised position from the chair-lowered position when the lever arm assembly is moved from the chair-lowered position to the chair-raised position. The chair-raised position enables the user to transport a wheelchair supported upon the support arms.

The pivot arms are preferably parallel to one another, and the support members are preferably parallel to one another.

Together, the parallel pivot arms and parallel support members enhancing uniform motion and transport of the wheelchair during chair-raising and transport operations. The frame member preferably comprises a U-shaped channel structure and the pivot arms comprise outer arm surfacing. The outer arm surfacing of the pivot arms is receivable in the U-shaped channel structure when moving from the chair-lowered position to the chair-raised position.

The chair support assembly may preferably comprise certain means for maintaining the support members in parallel relation one another, which means may be defined by a medial structural member and a lateral structural member. The medial and lateral structural members extend intermediate the forward and rearward support members and each has a vertical dimension for providing stop structure, the stop structure for preventing a supported wheelchair from displacing medially and laterally.

The lever arm assembly preferably comprises a telescopic lifting arm that is extendable for increasing torque when moving from the chair-lowered to chair-raised position, and retractable for removing structural obstruction when in the chair-raised position. A latch assembly and an ASV folding lever assembly prevent accidental release of the pivot arms and support members from the chair-raised position, and are preferably incorporated in the overall design.

The wheelchair transport apparatus may further comprise an L-shaped chair-spacer construction, the chair-spacer construction comprising an upright spacer portion and a lateral spacer portion. The upright spacer portion extends vertically and the lateral spacer portion extends laterally from the frame member.

The lateral spacer portion spaces an upper portion of the supported wheelchair from the upright spacer portion, and basically functions to enhancing securement of the supported wheelchair to the wheelchair transport apparatus and motorized tricycle. A medial wheel assembly of the supported wheelchair is received in inferior adjacency to the lateral spacer portion and in lateral adjacency to the upright spacer portion.

Accordingly, although the invention has been described by reference to certain preferred and alternative embodiments, it is not intended that the novel arrangements be limited thereby, but that modifications thereof are intended to be included as falling within the broad scope and spirit of the foregoing disclosures and the appended drawings.

I claim:

1. A wheelchair transport system for transporting a wheelchair by way of a motorized, tadpole-configured tricycle, the wheelchair transport system comprising in combination:
    a tadpole-configured motorized tricycle, the tadpole-configured motorized tricycle comprising two laterally opposed front wheels, a rear wheel, a lateral trike plane, a maximum left lateral trike extent, a maximum right lateral trike extent, and a trike weight, the maximum left and right lateral trike extents being equidistant distant from the lateral trike plane at a select extent distance; and
    a wheelchair transport apparatus, the wheelchair transport apparatus comprising a main frame, a pivot assembly, a lever arm assembly, a maximum lateral apparatus extent, and an apparatus weight, the maximum lateral apparatus extent being no greater than the select extent distance, the main frame comprising an elongate frame member and attachment means for attaching the frame member to the motorized tricycle, the pivot assembly comprising a pivot arm assembly and a chair support assembly, the pivot arm assembly comprising a forward pivot arm, a rearward pivot arm and means for pivotally attaching the forward and rearward pivot arm to the main frame via a pair of frame-fixed upper pivot axes, the chair support assembly comprising a forward support member, a rearward support member and means for pivotally and respectively attaching the forward and rearward support members to the forward and rearward pivot arms, the support members being coaxial with a pair of frame-translatable lower pivot axes, the lever arm assembly being attached to the forward pivot arm, the lever arm assembly, the pivot arms, and the support arms being positionable intermediate a lowered position and a raised position, the pivot arms being rotatable about the upper and lower pivot axes and the support members being raisable to the raised position from the lowered position when the lever arm assembly is manually moved from a rearward, lowered position to a forward, raised position, said raised positions for transporting a wheelchair having a wheelchair weight supported upon the support arms, the apparatus weight and the wheelchair weight being less than the trike weight, the trike weight and the maximum left and right lateral trike extents for maintaining the apparatus and said wheelchair in a uniform vertical position during transport, said wheelchair transport system for transporting said wheelchair by way of said motorized tricycle and wheelchair transport apparatus.

2. The wheelchair transport system of claim 1 wherein the main frame comprises an upper attachment arm construction, the upper attachment arm construction extending intermediate an upper portion of the motorized tricycle and the frame member in a lateral direction for laterally spacing arm attachment sites of the upper attachment arm construction from the frame member.

3. The wheelchair transport system of claim 1 wherein the pivot arms are parallel to one another and the support members are parallel to one another, the parallel pivot arms and the parallel support members for enhancing uniform motion and transport of said wheelchair during chair transport operations.

4. The wheelchair transport system of claim 1 wherein the frame member comprises a U-shaped channel structure and the pivot arms comprise outer arm surfacing, the outer arm surfacing of the pivot arms being receivable in the U-shaped channel structure when moving from the lowered position to the raised position.

5. The wheelchair transport system of claim 1 wherein the chair support assembly comprises means for maintaining the support members in parallel relation to one another, said means comprising a medial member and a lateral member, the medial and lateral members extending intermediate the forward and rearward support members and each having a vertical dimension for providing stop structure, the stop structure for preventing said wheelchair from displacing medially and laterally.

6. The wheelchair transport system of claim 1 wherein the lever arm assembly comprises a telescopic lifting arm, the telescopic lifting arm being extendable for increasing torque when moving from the lowered to raised positions, and being retractable for removing structural obstruction when in the raised position.

7. The wheelchair transport system of claim 1 comprising a latch assembly and a lever assembly, the latch and lever assemblies for preventing accidental release of the pivot arms and support members from the raised position.

8. The wheelchair transport system of claim 1 wherein the main frame comprises an L-shaped chair-spacer construction, the chair-spacer construction comprising an upright spacer portion and a lateral spacer portion, the upright spacer portion extending vertically and the lateral spacer portion extending laterally from the frame member, the lateral spacer portion for spacing an upper portion of said wheelchair from the upright spacer portion, a medial wheel assembly of said wheelchair being receivable in inferior adjacency to the lateral portion and in lateral adjacency to the upright spacer portion.

9. A wheelchair transport apparatus for transporting a wheelchair by way of a motorized tricycle, the wheelchair transport apparatus comprising:
 a main frame, the main frame comprising an elongate frame member and attachment means for attaching the frame member to a motorized tricycle, the frame member extending in a first dimension;
 a pivot assembly, the pivot assembly comprising a pivot arm assembly and a chair support assembly, the pivot arm assembly comprising a forward pivot arm, a rearward pivot arm and means for pivotally attaching the forward and rearward pivot arms to the main frame via a pair of upper pivot axes, the forward and rearward pivot arms extending in a second dimension, the upper pivot axes extending in a third dimension, the chair-support assembly comprising a forward support member, a rearward support member and means for pivotally and respectively attaching the forward and rearward support members to the forward and rearward pivot arms, the support members extending in the third dimension, and being coaxial with a pair of lower pivot axes; and
 a lever arm assembly, the lever arm assembly being attached to the forward pivot arm and extending upwardly in the second dimension, the lever arm assembly, the pivot arms, and the support arms being positionable intermediate a lowered position and a raised position, the pivot arms being rotatable about the upper and lower pivot axes, and the support members being raisable to the raised position from the lowered position when the lever arm assembly is moved from the lowered position to the raised position, the raised position for transporting a wheelchair supported upon the support arms.

10. The wheelchair transport apparatus of claim 9 wherein the main frame comprises an upper attachment arm construction, the upper attachment arm construction extending in the second and third dimensions for laterally spacing arm attachment sites of the upper attachment arm construction from the frame member.

11. The wheelchair transport apparatus of claim 9 wherein the pivot arms are parallel to one another and the support members are parallel to one another, the parallel pivot arms and the parallel support members for enhancing uniform motion and transport of said wheelchair during chair transport operations.

12. The wheelchair transport apparatus of claim 9 wherein the frame member comprises a U-shaped channel structure and the pivot arms comprise outer arm surfacing, the outer arm surfacing of the pivot arms being receivable in the U-shaped channel structure when moving from the lowered position to the raised position.

13. The wheelchair transport apparatus of claim 9 wherein the chair support assembly comprises means for maintaining the support members in parallel relation to one another, said means extending intermediate the forward and rearward support members and comprising means for preventing said wheelchair from displacing medially and laterally.

14. The wheelchair transport apparatus of claim 9 wherein the lever arm assembly comprises an extendable-retractable lifting arm, said lifting arm being extendable for increasing torque when moving from the lowered to raised positions, and being retractable for removing structural obstruction when in the raised position.

15. The wheelchair transport apparatus of claim 9 comprising a latch assembly and a lever assembly, the latch and lever assemblies for preventing accidental release of the pivot arms and support members from the raised position.

16. The wheelchair transport apparatus of claim 9 wherein the main frame comprises an L-shaped chair-spacer construction, the chair-spacer construction comprising an upright spacer portion and a lateral spacer portion, the upright spacer portion extending in the second dimension and the lateral spacer portion extending in the third dimension, the lateral spacer portion for spacing an upper portion of said wheelchair from the upright spacer portion, a medial wheel assembly of said wheelchair being receivable in inferior adjacency to the lateral portion and in lateral adjacency to the upright spacer portion.

17. A transport apparatus for use with a motorized tricycle, the transport apparatus comprising:
 a main frame, the main frame comprising an elongate frame member and attachment means for attaching the frame member to a motorized tricycle;
 a pivot assembly, the pivot assembly comprising a pivot arm assembly and a chair support assembly, the pivot arm assembly comprising a pivot arm and means for pivotally attaching the pivot arm to the main frame, the chair support assembly comprising a first and second support members and means for pivotally attaching the support members to the pivot arm, the support members being cooperable with a pair of lower pivot axes; and
 a lever arm assembly, the lever arm assembly being attached to the pivot arm, the lever arm assembly, the pivot arm, and the support arms being positionable intermediate a lowered position and a raised position, the pivot arm being rotatable, and the support members being raisable to the raised position from the lowered position when the lever arm assembly is moved from the lowered position to the raised position.

18. The wheelchair transport apparatus of claim 17 wherein the main frame comprises an upper attachment arm construction, the upper attachment arm construction extending in space for laterally spacing arm attachment sites of the upper attachment arm construction from the frame member.

19. The wheelchair transport apparatus of claim 17 wherein the frame member comprises a U-shaped channel structure and the pivot arm comprises outer arm surfacing, the outer arm surfacing of the pivot arm being receivable in the U-shaped channel structure when moving from the lowered position to the raised position.

20. The wheelchair transport apparatus of claim 17 wherein the main frame comprises an L-shaped chair-spacer construction, the chair-spacer construction comprising an upright spacer portion and a lateral spacer portion, the lateral spacer portion for spacing an upper portion of said wheelchair from the upright spacer portion, a medial wheel assembly of said wheelchair being receivable in inferior adjacency to the lateral portion and in lateral adjacency to the upright spacer portion.

* * * * *